United States Patent
Gaebelein et al.

(10) Patent No.: US 10,279,429 B2
(45) Date of Patent: May 7, 2019

(54) METHODS FOR MANUFACTURING A TIRE MOLD AND DISPLACING THE AIR FROM THE MOLD INTO A COMPRESSION CAVITY DURING THE TIRE MAKING PROCESS

(71) Applicants: Jens Guenter Gaebelein, Freienfeld/Campo di Trens (IT); Jeroen Hribar, Lucerne (CH); se2quel Management GmbH, Mühlacker (DE)

(72) Inventors: Jens Guenter Gaebelein, Freienfeld/Campo di Trens (IT); Jeroen Hribar, Lucerne (CH)

( * ) Notice: Subject to any disclaimer, the term of this patent is extended or adjusted under 35 U.S.C. 154(b) by 224 days.

(21) Appl. No.: 15/097,273

(22) Filed: Apr. 12, 2016

(65) Prior Publication Data

US 2016/0221286 A1    Aug. 4, 2016

Related U.S. Application Data

(63) Continuation of application No. 14/803,105, filed on Jul. 19, 2015, now abandoned, and a continuation of
(Continued)

(51) Int. Cl.
*B23K 26/146* (2014.01)
*B23P 17/02* (2006.01)
(Continued)

(52) U.S. Cl.
CPC ........ *B23K 26/146* (2015.10); *B22D 19/0072* (2013.01); *B23K 26/0608* (2013.01); *B23K 26/0648* (2013.01); *B23K 26/142* (2015.10); *B23K 26/1462* (2015.10); *B23K 26/1464* (2013.01); *B23K 26/1482* (2013.01); *B23K 26/38* (2013.01); *B23P 17/02* (2013.01);
(Continued)

(58) Field of Classification Search
CPC .. B23K 26/146; B23K 26/38; B23K 26/1464; B23K 26/142; B23K 26/1482; B23K 26/1462; B29C 33/10; B29C 33/3842; B29D 30/0606; B29D 30/0629; B23P 17/02; B22D 19/0072
See application file for complete search history.

(56) References Cited

U.S. PATENT DOCUMENTS

| | | | |
|---|---|---|---|
| 3,553,790 A * | 1/1971 | Brobeck et al. | B29C 33/10 425/35 |
| 2007/0063369 A1 | 3/2007 | Byrne | |
| 2015/0210025 A1* | 7/2015 | Martin | B60C 11/0311 425/182 |

FOREIGN PATENT DOCUMENTS

GB        767460        2/1957

OTHER PUBLICATIONS

Non-Final Rejection for U.S. Appl. No. 14/556,222; dated Mar. 12, 2015.

* cited by examiner

*Primary Examiner* — Mathieu D Vargot
(74) *Attorney, Agent, or Firm* — Patent2ip LLC; Tue Nguyen

(57) ABSTRACT

A tire mold or a tire mold segment can include an air compression cavity, which connects to multiple surface connection slots having dimensions between 10 and 300 microns, which can be suitable for selective removal of air in the mold. The air compression cavity, can be close to the outside ambient, allowing the air escaping the interior of the mold to be compressed, which can assist in preventing the rubber material from leaving the mold pattern surface.

18 Claims, 35 Drawing Sheets

Related U.S. Application Data application No. 14/556,222, filed on Nov. 30, 2014, now Pat. No. 9,085,114.

(51) Int. Cl.
  *B23K 26/38* (2014.01)
  *B23K 26/14* (2014.01)
  *B23K 26/142* (2014.01)
  *B22D 19/00* (2006.01)
  *B29D 30/06* (2006.01)
  *B29C 33/10* (2006.01)
  *B29C 33/38* (2006.01)
  *B23K 26/06* (2014.01)
  B23K 103/16 (2006.01)
  B23P 19/04 (2006.01)
  B33Y 10/00 (2015.01)
  B33Y 80/00 (2015.01)

(52) U.S. Cl.
  CPC .......... *B29C 33/10* (2013.01); *B29C 33/3842* (2013.01); *B29D 30/0606* (2013.01); *B29D 30/0629* (2013.01); B23K 2103/16 (2018.08); B23P 19/047 (2013.01); B29D 2030/062 (2013.01); B29D 2030/0613 (2013.01); B29D 2030/0617 (2013.01); B33Y 10/00 (2014.12); B33Y 80/00 (2014.12); Y10T 29/49721 (2015.01); Y10T 29/49995 (2015.01); Y10T 29/49996 (2015.01)

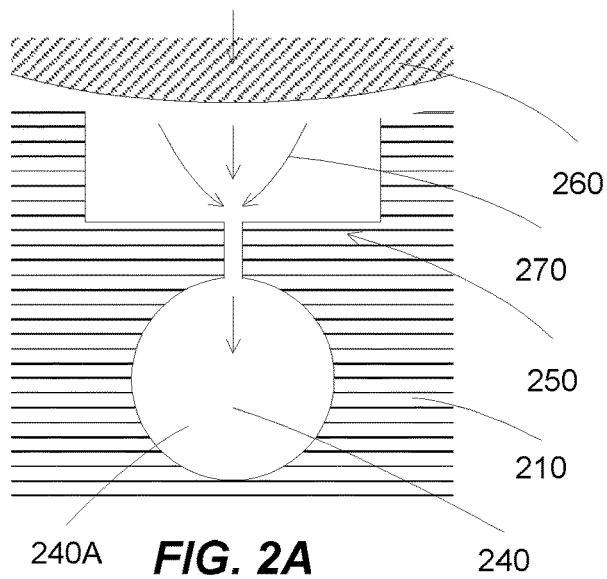
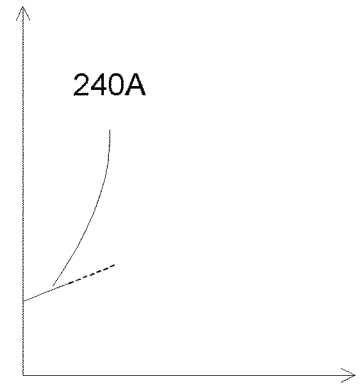
FIG. 2A
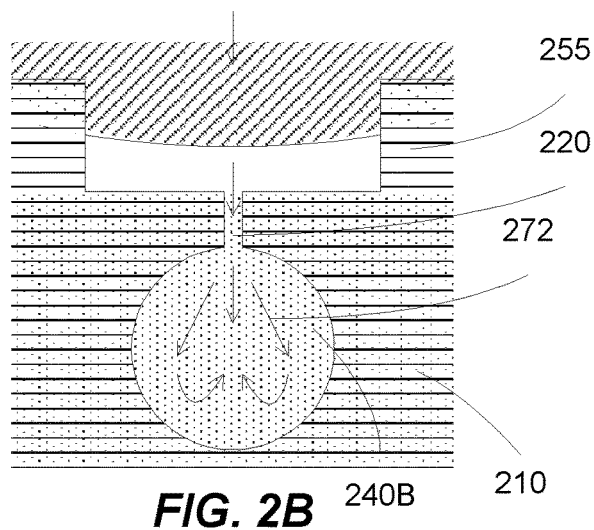
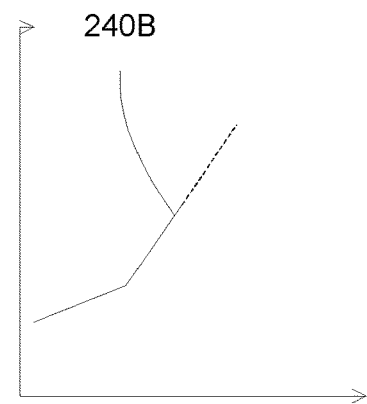
FIG. 2B
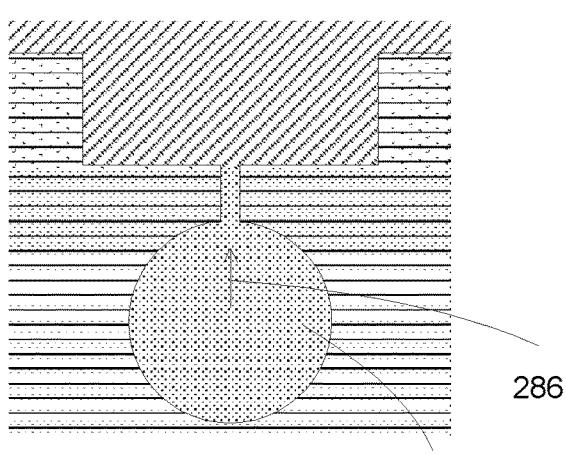
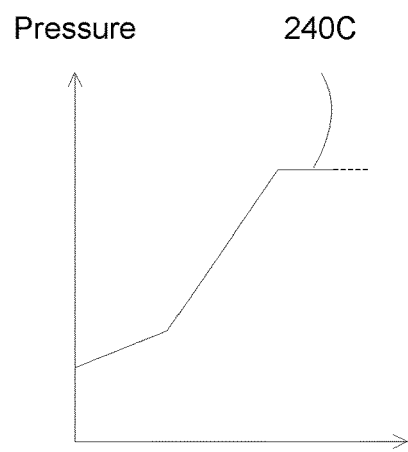
FIG. 2C

```
┌─────────────────────────────────────────┐
│  Providing a tire mold body, wherein the tire mold body  │
│       comprises a tire tread surface    │
│                  300                    │
└─────────────────────────────────────────┘
                    │
                    ▼
┌─────────────────────────────────────────┐
│  Forming at least an air compression cavity inside the tire  │
│              mold body                  │
│                  310                    │
└─────────────────────────────────────────┘
                    │
                    ▼
┌─────────────────────────────────────────┐
│  Forming one or more surface connection slots from the tire  │
│  tread surface of the tire mold body, wherein the surface    │
│  connection slots are connected to the air compression cavity│
│                  320                    │
└─────────────────────────────────────────┘
                    │
                    ▼
┌─────────────────────────────────────────┐
│  Wherein the volume of the air compression cavity is    │
│  configured to prevent a rubber material from entering the   │
│  surface connection slots due to air compression        │
│                  330                    │
└─────────────────────────────────────────┘
```

FIG. 3

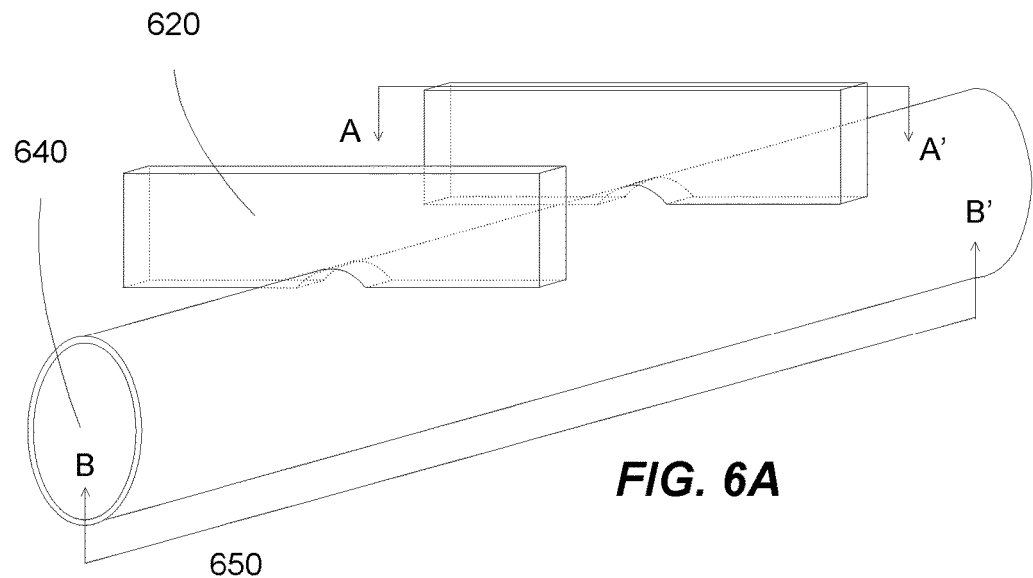
FIG. 6A
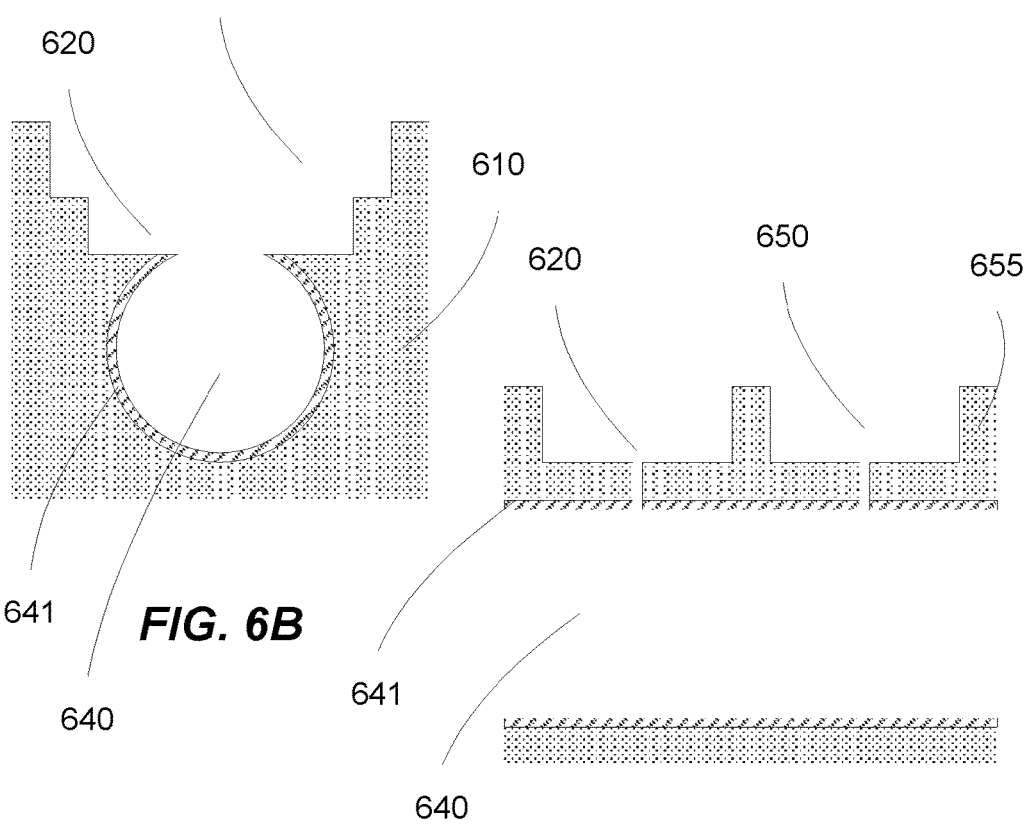
FIG. 6B
FIG. 6C

```
┌─────────────────────────────────────────────┐
│  Providing a tire tread model mold, wherein the tire tread
│  model mold comprises a positive tread pattern of a tire
│                       1700
└─────────────────────────────────────────────┘
                        │
                        ▼
┌─────────────────────────────────────────────┐
│  Attaching an element along a first surface of the tire tread
│  model mold, wherein the element is spaced apart from the
│  first surface, wherein the element comprises a hollow
│  element or a sacrificial element, wherein the element is
│      configured to form an air compression element
│                       1710
└─────────────────────────────────────────────┘
                        │
                        ▼
┌─────────────────────────────────────────────┐
│   Casting a negative mold using the tire tread model mold,
│  wherein the cast negative mold comprises the element and a
│     mirror image of the positive tread pattern on a second
│                 surface of the negative mold
│                       1720
└─────────────────────────────────────────────┘
                        │
                        ▼
┌─────────────────────────────────────────────┐
│  Forming connection elements from the second surface to the
│  hollow portion of the hollow element, wherein a dimension of
│    the connection elements is between 10 and 300 microns
│                       1730
└─────────────────────────────────────────────┘
```

*FIG. 17*

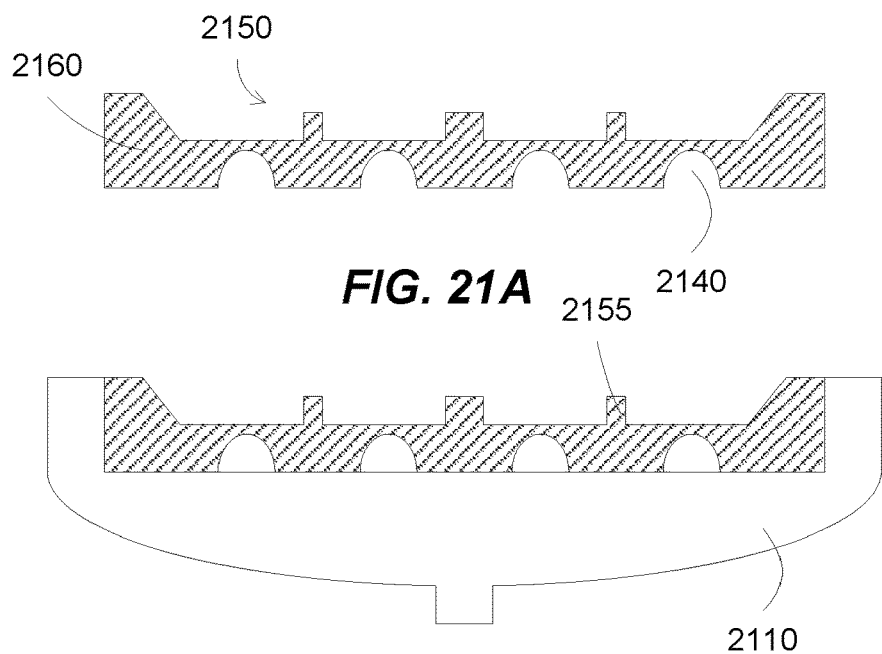
FIG. 21A
FIG. 21B
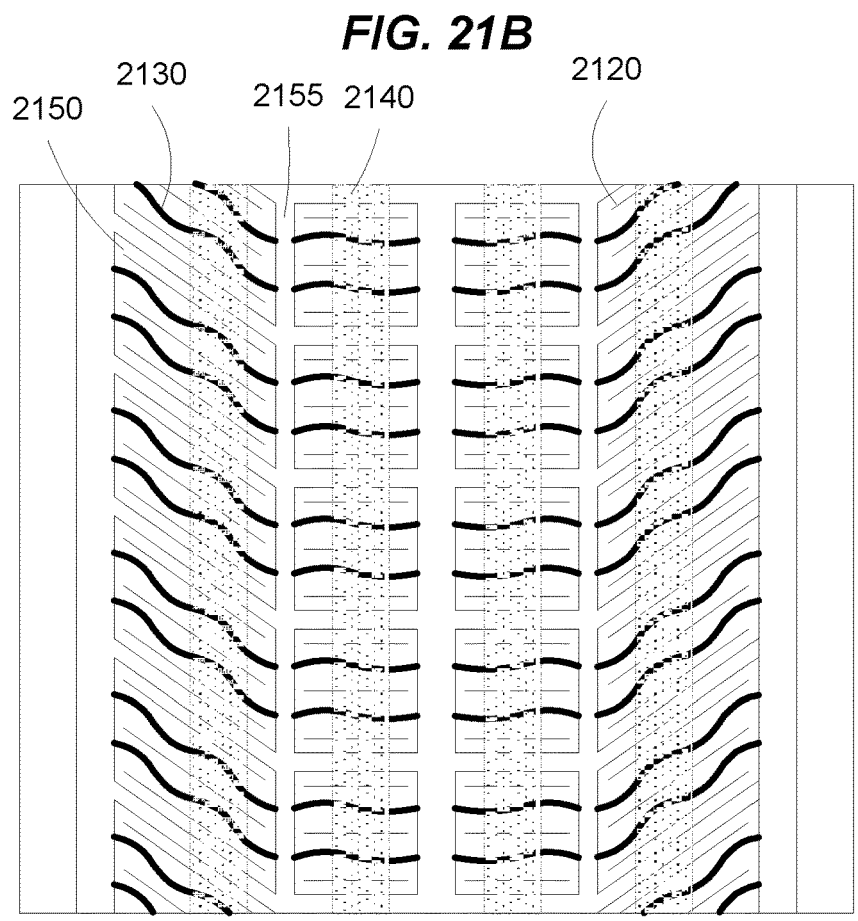
FIG. 21C

Providing a tire mold body, wherein the tire mold body comprises a tread pattern of a tire, wherein the tire mold body comprises multiple sipes, wherein the tire mold body comprises an air compression cavity
3000

Forming surface connection slots from the tread pattern to the air compression cavity, wherein a dimension of the air evacuation slots is between 10 and 300 microns
3010

Supplying a compressed fluid to the air compression cavity, wherein the compressed fluid escapes the surface connection slots for cleaning
3020

*FIG. 30*

METHODS FOR MANUFACTURING A TIRE MOLD AND DISPLACING THE AIR FROM THE MOLD INTO A COMPRESSION CAVITY DURING THE TIRE MAKING PROCESS

This application is a continuation of application Ser. No. 14/803,105, filed on Jul. 19, 2015, now abandoned, and a continuation of application Ser. No. 14/556,222, filed on Nov. 30, 2014, now U.S. Pat. No. 9,085,114 and claims priority from U.S. Provisional Application No. 62/006,864 filed on Jun. 2, 2014 entitled "Methods for making a tire mold", U.S. Provisional Application No. 62/032,526 filed on Aug. 2, 2014 entitled "Methods for making a tire mold", and U.S. Provisional Application No. 61/915,510 filed on Dec. 13, 2013 entitled "Methods and systems to keep a work piece surface free from liquid accumulation while performing liquid-jet guided laser based material processing" are which all incorporated herein by reference.

BACKGROUND

A tire mold usually consists of multiple tread segments that together form a full circular tread mold. The mold is closed on the side by a side ring, which typically has the tire brand engraving, and other information such as size and operating pressure. The tire mold tread segment surface is shaped to be the negative of the actual tire tread surface. The tire tread mold segments and the 2 side rings, are held together by a container.

The tire mold segments can include vent structures to selectively evacuate air from the tire mold. Various methods for air evacuation have been described, with high manufacturing complexity and maintenance efforts such as cleaning or replacement.

U.S. Pat. No. 4,812,281 discloses vent holes, having a diameter between 3.81 to 12.7 mm, to allow air to be evacuated through such holes that fluidly connect the mold inner surface to the mold outer surface.

U.S. Pat. No. 6,923,629 describes spring vents, which can close the vent structure once the tire green has complete filled up the tread pattern in the mold. During the rubber vulcanization process, air can escape through the vent holes, with the spring loaded pins stopping the rubber material from entering the vent holes. Spring vents can be costly, for example, can contribute up to 10% of the manufacturing cost of the mold.

U.S. Pat. Nos. 6,382,943 and 6,826,819 describe a ventless approach in which the tread pattern surface of the mold is built up by many small pitches, also referred to as puzzle elements. Air is evacuated by leaving a small gap between such puzzle elements. The gap is chosen in such way that the air can pass through while at the same time the rubber is held back during the curing process. The ventless process can be limited to simple tread pattern. For example, winter tires can have a too complex tread pattern to be built as a puzzle. Further, puzzle mold can incur high manufacturing cost, which can be up to twice as expensive as a regular segmented mold.

Patents EP2719524 and DE102012104500 describes micro-venting channels, which connect the tread mold surface to an evacuation cavity such as a hole on the rear side of the mold. The channels are narrow enough to hold back the rubber during the curing process, while at the same time, allowing air to be evacuated. As each slot can require a connection to a venting cavity, several thousand of such evacuation cavities can be required for venting of a complex tread pattern.

U.S. Pat. No. 8,834,143 describes mechanical inserts to create narrow slots for air venting. This can result in several thousand inserts for a complex tread design such as for a winter tire. Tight tolerance of both the slots and the inserts can be required, for example, to avoid ejection upon de-molding of the cured tire.

Thus there is a need for improved systems and methods for curing tires.

SUMMARY OF THE DESCRIPTION

In some embodiments, the present invention discloses tire cure mold segments having air compression cavities. Surface connection slots can connect the air compression cavities with the tread surface of the tire mold segments. During a curing process, air can be displaced from the mold into the air compression cavity, for example, through the surface connection slots, to allow the rubber to adopt exactly the shape of the mold surface topography, and thus result in a proper tire surface profile for the cured tire. The tire molds, and the methods for making the tire mold as described in this invention can reduce the amount of manufacturing steps that are required for making a reliable air evacuation operation.

The air compression cavity can be isolated from the external ambient, thus air in the air compression cavity can be compressed during the curing process. For example, at the beginning of the curing process, the pressure in the air compression cavity can be at atmospheric pressure. During the tire curing process, air is displaced from the mold into the air compression cavity, increasing the pressure. The increased pressure can assist in blocking the rubber material from entering the surface connection slots, resulting in desired tire surface profiles.

The air compression cavity can be coupled to an external equipment, such as a vacuum system or a source of pressurized fluid and/or gas. The vacuum system can assist in displacing air from the mold into a compression cavity. The pressurized fluid can assist in removing the cured tire from the mold, or in cleaning the mold.

In some embodiments, the present invention discloses methods for forming a tire mold, including a tire mold segment. Air compression cavities can be formed in the tire mold body. Sipe slots and surface connection slots can be formed, for example, by a liquid jet guided laser system. A pressurized fluid, such as alcohol, alcohol aerosol, and/or air, can be applied to the air compression cavities to clean the tire mold.

In some embodiments, the present invention discloses methods for forming tires from tire mold segments having air compression cavities. Multiple tire mold segments can be assembled to form a circumferential mold covering a green tire. The green tire can be cured, and during the curing process, air in the tire mold can be displaced to the air compression cavities. After the curing process, a compressed source, such as a compressed air, can be applied to the air compression cavities. The compressed air can enter the surface connection slots, forming a layer of air at an interface between the cured tire and the mold. The air layer can reduce the adhesion between the cured tire and the mold, which can facilitate the removal of the cured tire from the mold. The tire mold segments can be disassembled, and the cured tire is removed from the disassembled mold. Coupling elements can be placed between the tire mold segments for connecting the air compression cavities between the tire mold segments. A pressure source, such as a pressurized fluid, can be applied to the air compression cavities. The pressurized fluid can enter the surface connection slots, removing rubber debris from the air connection slots. The coupling elements can be removed, and the tire mold segments is ready for processing another green tire.

BRIEF DESCRIPTION OF THE DRAWINGS

FIGS. 2A-2C illustrate an air compression cavity in a tire mold segment according to some embodiments.

FIG. 3 illustrates a flow chart for forming a tire mold segment according to some embodiments.

FIGS. 6A-6C illustrate a configuration for multiple surface connection slots intersecting an air compression cavity according to some embodiments.

FIG. 17 illustrates a flow chart for forming a tire mold or a tire mold segment having an air compression cavity according to some embodiments.

FIGS. 21A-21C illustrate a two-part tire mold segment according to some embodiments.

FIG. 30 illustrates a flow chart for cleaning a tire mold after making the tire mold according to some embodiments.

DETAILED DESCRIPTION OF THE EMBODIMENTS

Figure 1A:
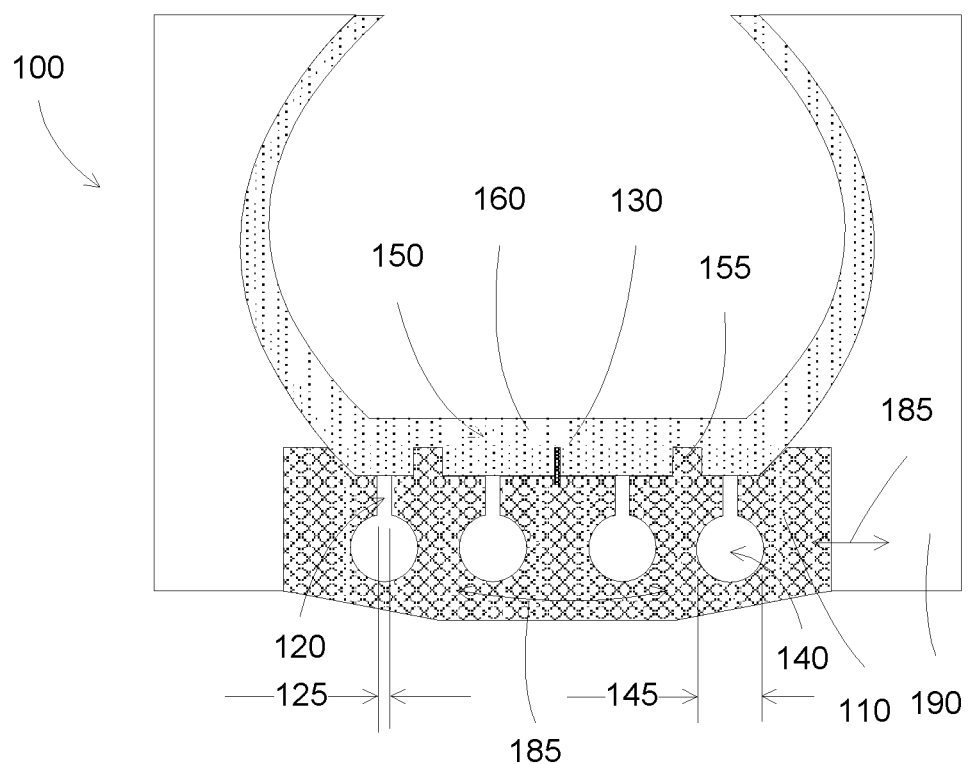
FIGS. 1A-1B illustrate tire molds having tire segments according to some embodiments.

In some embodiments, the present invention discloses methods and systems for making molds, such as tire mold segments or complete tire molds, which can include multiple tire mold segments assembling together. The tire molds can include one or more air compression cavities, with each air compression cavity connected to multiple surface connection slots for accepting air from the mold to be compressed in the air compression cavity. The surface connection slots can have a dimension allowing air to pass through, but blocking rubber materials. Alternatively, or in addition, the volume of the air compression cavities can be selected to generate an air pressure in the air compression cavities, which can assist in blocking the rubber materials from entering the surface connection slots.

In some embodiments, the present invention discloses tire molds, which include surface connection slots leading to air compression cavities in the tire molds, and methods to form tire molds. The surface connection slots and sipe slots in the tire molds can be created using a liquid jet guided laser system.

In some embodiments, the present invention discloses a tire curing mold segment, and operations related to the tire curing mold segments, such as fabricating the tire mold segments, operating the tire mold segments in a tire curing process, and cleaning the tire mold segments. Air can be displaced from the mold into a cavity, e.g., called an air compression cavity since air is led to and then being compressed in the cavity, during the curing process to allow the rubber to adopt exactly the shape of the mold surface topography and thus result in a proper tire surface profile for the cured tire. The present method for making a tire mold can reduce the amount of manufacturing steps that are required for making a reliable air evacuation operation.

The present air compression cavity can be distinct and have advantages over prior arts of removing air to the outside ambient. For example, as compared to micro-holes, for example, described in U.S. Pat. No. 4,812,281, the number of air compression cavities can be significantly less, e.g., can be between 4 and 20, as compared to up to 8,000 holes in the micro-hole process, leading to less manufacturing complexity and maintenance efforts. As compared to sprint vents, for example, described in U.S. Pat. No. 6,923,629, the air compression cavity process can present less complexity and lower cost due to the avoidance of the spring vent elements, and less maintenance efforts due to the cleaning and replacement of the spring vent elements. As compared to ventless technology, for example, described in U.S. Pat. Nos. 6,382,943 and 6,826,819, the air compression cavity process can present less complexity and lower cost due to enabling the use of large mold segments, instead of up to more than 100 puzzle mold pieces. As compared to micro-venting channels, for example, described in patents EP2719524A1, and DE102012104500A1, the number of air compression cavity can be significantly less, as compared to several thousand of evacuation cavities on the rear side of the mold. As compared to mechanical insert process, for example, described in U.S. Pat. No. 8,834,143, the surface connection slots can present less complexity and lower cost since it does not require a large amount of mechanical inserts with accurate press fit insert.

In some embodiments, the present invention discloses methods for making a tire mold that can allow air to enter into a surface connection slot during the tire curing process, with the surface connection slot being narrow enough to limit the rubber from entering into such slot. The surface connection slots can be connected to few but large air compression cavities inside the mold segment. The surface connection slots can be generated by means of a single mechanical processing step immediately in the required width, thus making the use of any inserts obsolete. The large air compression cavities in the mold can be used to compress or pressurize the air instead of evacuating or venting the air with the purpose of further limiting the rubber to enter into the surface connection slots that connect to the mold surface. The large air compression cavities in the mold can be used to connect to a high pressure liquid or gas source (e.g., air) to allow cleaning of the mold in regular intervals (rubber debris removal from the surface connection slots). The large air compression cavities in the mold can be used to create process control by accepting sensors for the manufacturing process of the connecting surface connection slots.

In some embodiments, the present invention describes a cost-effective production of the mold, secures a robust mold architecture by eliminating the need of any mechanical or inserted and post-fixed parts for air evacuation, and facilitates a simple cleaning process for the air evacuation structures.

Tire molds are typically made from metal or metal alloy materials, such as aluminum or steel, which can be cast or CNC machined to form the desired negative tread pattern. Tire mold tread layers can also be made from an additive manufacturing technology, such as 3D printing, which are then coupled to tire mold supports.

Figure 1B:
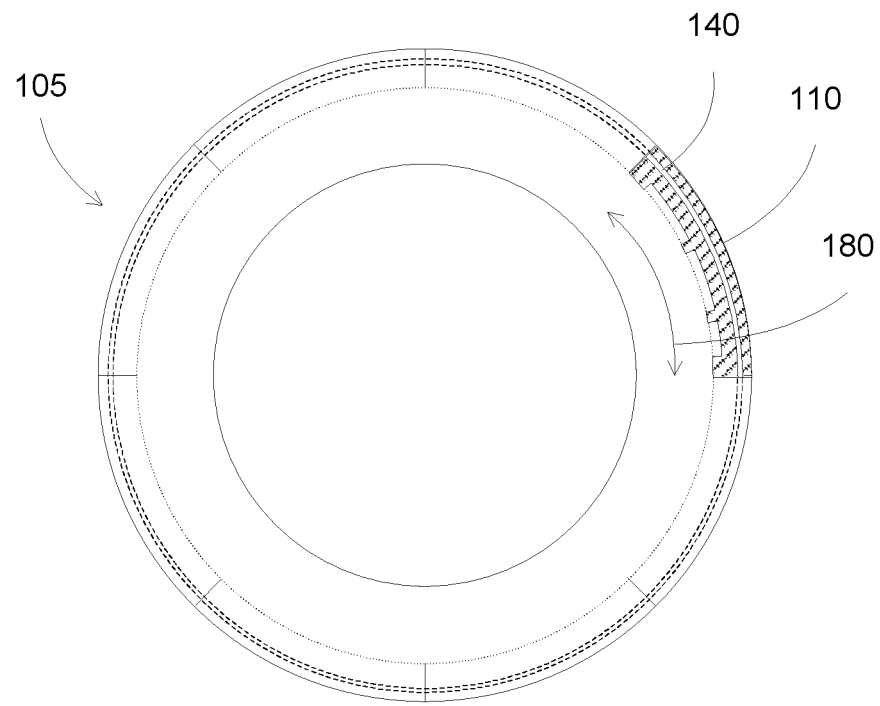

FIGS. 1A-1B illustrate tire molds having tire segments according to some embodiments. In FIG. 1A, a tire mold can include multiple mold components 100 assembled together, including a tire mold segment 110 and side rings 190. The tire mold segment 110 can include tread pattern blocks 150 for forming tread blocks in a tire, including sipes 130 and tread block sidewalls 155. In FIG. 1B, a complete tire mold 105 can include multiple tire mold segments 110 assembled together to form a complete circumferential mold, with the air compression cavities 140 from different tire mold segments connected to each other to form larger air compression cavities. As shown, the air compression cavity 140 is disposed along a circumferential direction 180 of the tire or the tire mold 105. Other configurations can also be used, such as the air compression cavity is disposed along a width direction 185 across a thickness of the tire or the tire mold 100.

Each air compression cavity is isolated from nearby air compression cavities, or each two air compression cavities are coupled to each other.

In some embodiments, the tire mold segment 110 can be made from a material having high anti-sticking coefficient. Thus the rubber tire 160 can be easily removed from the tire mold after completing the vulcanization process. The tire mold segment can have surface connection slots 120, which are small enough for air to pass through without allowing the rubber material to enter. For example, the surface connection slots 120 can include a line having a line width 125, which can be between 10 and 300 microns. The surface connection slots can be formed by a cutting process, such as a liquid jet guided laser cutting.

In some embodiments, the tire mold segment 110 can have air compression cavities 140 embedded inside the tire mold. The cavities can store the air in the mold, e.g., can provide a location to displace the air into, for example during the tire curing process. The evacuation of the air inside the mold can prevent the air to be trapped in the mold, which can result in the formation of irregularities in the cured tire surface that can have the shape of the respective air bubbles in the tires. The air inside the mold, after being evacuated, can be directed to the cavities in the form of compressed air. The compressed air can be configured, e.g., the air compression cavities 140 can be designed to have a proper dimension 145, to exert a slight pressure, such as between 1 and 2 bars, to ensure that the rubber material completely fills the tire mold interior, but preventing the rubber material from entering the surface connection slots. For example, the cavities can have a cylindrical shape, with a diameter in order of millimeters, such as between 1 and 10 mm, or between 3 and 5 mm. The cavities can have other shapes, such as rectangles or lines running along or intersecting the surface connection slots.

In some embodiments, the present invention discloses a tire mold that includes multiple mold segments and supports, including mold inserts for forming tire treads. Some mold segments can have a tread pattern that is used to form treads in a rubber tire. Some mold supports can have a ground surface without tread pattern that is used to mount mold inserts with tread pattern.

In some embodiments, the present invention discloses methods and systems to form a tire mold or a tire mold segment using an air compression cavity. Instead of exhausting the air in the tire mold to the outside ambient during the vulcanization process, the air can be compressed into a cavity. The air compression cavity can accept the air from the tire mold, thus functioning as an exhaust for the air inside the tire mold. Further, different from ambient air exhaust, the air compression cavity can have pressure built up in the cavity, which can assist in blocking rubber material from protruding outside the tread surface. For example, at a beginning of a tire vulcanization process, the pressure in the air compression cavity is at atmospheric pressure. When the rubber approaches the surface connection slots, air can escape to the air compression cavity, increasing the pressure in the cavity. The increased pressure can stop the rubber material from entering the cavity.

In some embodiments, the air compression cavity is embedded inside the tire mold segment, without any access, e.g., fluid communication, to the outside ambient, e.g., there is no connection from the air compression cavity to the outside surface of the tire mold segment. The air compression cavity can have multiple connections, e.g., connections through the air compression cavity to the tread surface of the mold segment. The connections can have a dimension less than the volume dimension of the cavity, such as a dimension calculated to allow air to enter the cavity but not rubber material. The air compression cavity can have a large volume, such as a volume calculated to contain the air inside the tire mold portion in pressurized form.

A tire mold can consist of multiple mold segments. Each mold segment can have a tread surface. This tread surface is the negative shape of the tire. The mold segments can be closed to form one circumferentially closed mold in which a tire can be cured.

For curing, the tire is inserted into the mold and the mold segments are closed as described above. Upon closure of the mold, the rubber of the tire green is pressed into the negative tread pattern. The tire green must exactly adopt the shape of the tread pattern in the mold. To allow this, the air layer between the tire green and the mold must be displaced into a suitable and big enough cavity.

In some embodiments, the present invention discloses using large air compression cavities to displace the air into during the curing process. The large compression cavities can be placed in a circumferential direction 180 inside the mold segment. The amount of compression cavities can match the amount of tread blocks in lateral direction of the profile i.e. in case of 3 circumferential tread grooves there can be only 4 compression cavities needed. The large compression cavities can be placed in a cross direction 185 making an angle, such as 90° to the circumferential direction 180. The number of cavities can be higher to connect all the tread pattern. Other angles can be used. In addition, a combination of cavities having the circumferential direction and the cross directions, which can be cross-linked.

The compression cavities are fluidly connected to the mold tread surface by surface connection slots. These surface connection slots can be 10 to 300 um to allow air passing through, but to limit rubber from entering into the slots. The direction of the slots in the tread profile can be in any direction. To connect as much of the tread block to the compression cavity it can be preferential to position the slots in the same direction as the sipes i.e. in between the sipes. The slots can follow any freeform shape such as a line, a sine, a wave etc.

To create an effective volume flow into the compression cavity, the slots can be 0.3-6 mm deep, e.g., the compression cavity is located 0.2-5.5 mm below the tread surface of the mold.

After the tire is cured, the mold is opened again. An active flow of air can be provided to the compression cavity using a one-way valve to build an air-layer between the mold and the cured tire to facility the de-molding. A suitable pressure can be selected to improve this effect, for example 1-2 bar.

After the tire is de-molded, a higher pressure can be used to remove any debris from the slots, for example 4-10 bar.

FIGS. 2A-2C illustrate an air compression cavity in a tire mold segment according to some embodiments. The tire mold segment can have a negative surface profile of the tire tread pattern on an inner surface, which can allow the transfer of the tire tread pattern to the rubber tire. The air in the tire mold can be evacuated to an air compression cavity, preventing the air to form bubbles or other defects during the formation of the tire. The tire mold can include air evacuation structures, e.g., slits in the mold, having dimensions between 10-300 microns, to allow air to escape but blocking rubber material.

A tire mold segment 210 can include a negative image of a tread pattern. The tread pattern can include multiple tread blocks 250, which are separated from each other by tread block sidewalls 255. In the tread block 250 and inside the tire mold segment body, an air compression cavity 240 can be included, together with a surface connection slot 220 at an opening of the cavity. The air compression cavity 240 is isolated from an outside ambient. Other components can be included, such as sipes.

Rubber material 260 can approach the tread pattern of the tire mold segment 210. Air inside the tire mold segment can enter 270, e.g., through the surface connection slot 220, to the air compression cavity 240. The pressure 240A in the air compression cavity 240 can gradually increase.

As the rubber material approaching the tread pattern, more air can enter 272 the air compression cavity, increasing the pressure 240B in the cavity 240. The rubber material can stop at the surface connection slot 220, for example, due to the dimension of the surface connection slot 220, that is large enough to allow air to pass through, but is small enough the prevent the passage of the rubber material. The pressure 240C can be constant after the rubber material reaches the surface connection slot 220. The pressure 240C in the air compression cavity 240 can be large enough to exert a force 286 on the rubber material at the surface connection slot 220. Thus the air compression cavity can assist in stopping the rubber material from entering the surface connection slot.

The cavity can start from the opposite side of the mold, e.g., the outer surface of the mold or the surface not having the tread pattern. The cavity can have different sizes and shapes, such as cylindrical shape or rectangular shape, cone shape, or flat cone shape, e.g., cone shape with flat top.

The surface connection slots can include multiple surface connection slots, either straight lines or curve lines. For example, more than one surface connection slot can be used for large tread blocks, e.g., to allow complete evacuation of air in the tread block during the vulcanization process.

In some embodiments, a liquid jet guided laser system (such as described in for example U.S. Pat. No. 8,859,988, which is hereby incorporated by reference in its entirety for all purpose) can be used to form the surface connection slots 220, having practically any patterns. An x-y mechanism, such as a CNC mechanism, with ultimately 5 axis movement) can be coupled to the liquid guided laser beam, which can move the laser beam in any directions to form the patterns. Thus the surface connection slots can include multiple channel lines, either straight lines or curve lines, depending on the requirements of the object. For example, for tire molds, more than one surface connection slot can be used for large tread blocks, e.g., to allow complete evacuation of air in the tread block during the vulcanization process.

FIG. 3 illustrates a flow chart for forming a tire mold segment according to some embodiments. Operation 300 provides a tire mold body. The tire mold body can include a tire mold segment. The tire mold body can have a tread pattern formed on an inner surface, e.g., a tread surface of the tire mold body. The tire mold body can be cast, milled, or built, for example, by an additive manufacturing process. The tire mold can also have sipes installed, for example, in tread blocks of the tread pattern. The tire mold body can be in one piece, or can be in multiple pieces that can be attached together. Operation 310 forms at least an air compression cavity inside the tire mold body. In some embodiments, the air compression cavity can be formed at an outer surface of the tire mold body, and then a cover can be placed to block or seal the opening to the air compression cavity. Alternatively, a valve can be coupled to the opening to the air compression cavity, to provide controlled access to the air compression cavity. Operation 320 forms more than one surface connection slots from a surface of the tire mold body, such as the tread pattern surface. The surface connection slots can be connected to the air compression cavity. Multiple surface connection slots can be formed connected to an air compression cavity, thus can simplify the fabrication process of the tire mold segment. The number of the surface connection slots can be determined by the types of the tires, for example, high performance or winter tires can have more surface connection slots due to the complexity of the tread pattern. Using multiple surface connection slots to connect to an air compression cavity, a much reduced number of air compression cavities can be used. For example, 4-10 air compression cavities can be formed for a tire mold segment, as compared to thousands of blind holes at the backside of each surface connection slot to outside atmosphere.

In some embodiments, the volume of the air compression cavity can be configured to prevent a rubber material from entering the surface connection slots due to increased pressure caused by air compression 320.

Different air compression cavity configurations can be used, together with different methods of forming the air compression cavity. The air compression cavity can be characterized as a volume that can be connected to more than one, such as 10, 20, 60, or even 100 surface connection slots. The air compression cavity can be completely isolated, e.g., sealed, from the outside ambient, e.g., as a closed cavity inside the tire mold segment. The air compression cavity can be conditionally isolated, for example, the air compression cavity in a tire mold segment can be open to outside ambient, but the openings can be coupled to a nearby tire mold segment, so that the composite cavity can be isolated from the ambient. The air compression cavity can be connected to a valve leading to an external equipment. Thus by closing the valve, the air compression cavity is isolated from the ambient, and by opening the valve, the air compression cavity can be connected to the external equipment, such as a vacuum pump assembly for faster and more efficient displacement of air from the mold into a compression cavity, or a source of a compressed gas, liquid, or gas/liquid mixture for pressurizing or for cleaning the cavity and the surface connection slots. The valve can be an one-way valve, which, in some cases, can allow compressed gas, liquid, or gas/liquid mixture to enter the cavity to clean the tire mold, while functioning as a closed cavity.

In some embodiments, the air compression cavity can be coupled to an outlet, which can be sealed to form a close cavity, or can be coupled to a compressed source for cleaning the surface connection slots, or can be coupled to a vacuum system to assist in displacement of air from the mold into a compression cavity, or can be coupled to a compressed gas source to apply pressure to facilitate the de-molding process.

Different configurations of the air compression cavity can be used. For example, the air compression cavity can be simply a cavity inside the tire mold segment. The air compression cavity can include a hollow conduit, such as a hollow round tube, a hollow square tube, or a hollow tube having any shape.

Figure 4A:
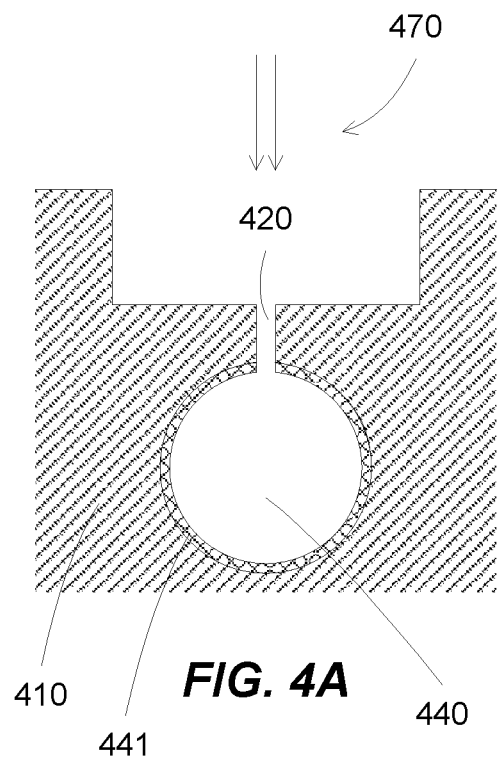
FIGS. 4A-4B illustrate air compression cavities from hollow conduits according to some embodiments.
Figure 4B:
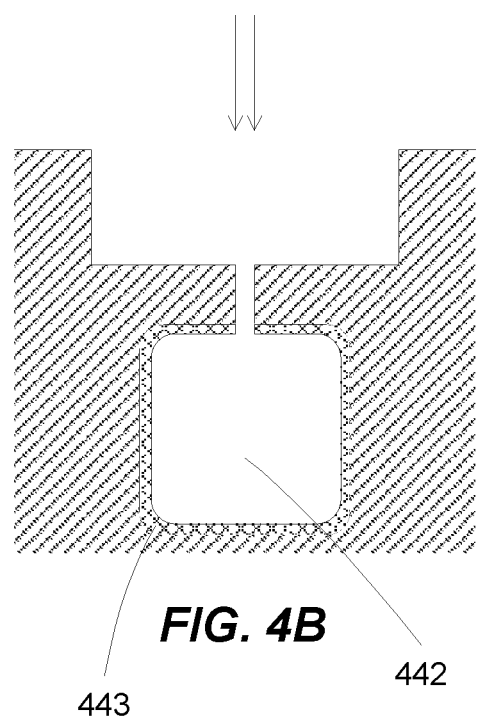

FIGS. 4A-4B illustrate air compression cavities from hollow conduits according to some embodiments. In FIG. 4A, a cavity 440 can be formed in a tire mold segment 410 using a hollow element 441. For example, a hollow round tube (or other hollow elements) can be placed in a mold during the casting process to form the tire mold. After the mold is formed with the hollow tube embedded in the tire mold, surface connection slots 420 can be formed, for example, by a liquid jet guided laser system 470 (such as described in for example U.S. Pat. No. 8,859,988), cutting through the tire mold material and the shell of the hollow tube to connect to the inner volume of the hollow tube. Other configurations can be used. For example, FIG. 4B shows a cavity 442 formed by using a square hollow tube 443.

Figure 5A:
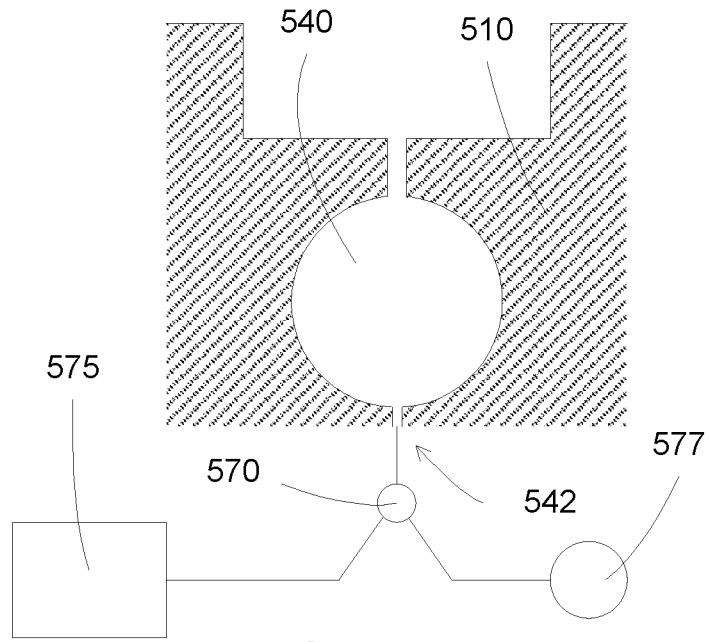
FIGS. 5A-5B illustrate operating configurations for an air compression cavity according to some embodiments.
Figure 5B:
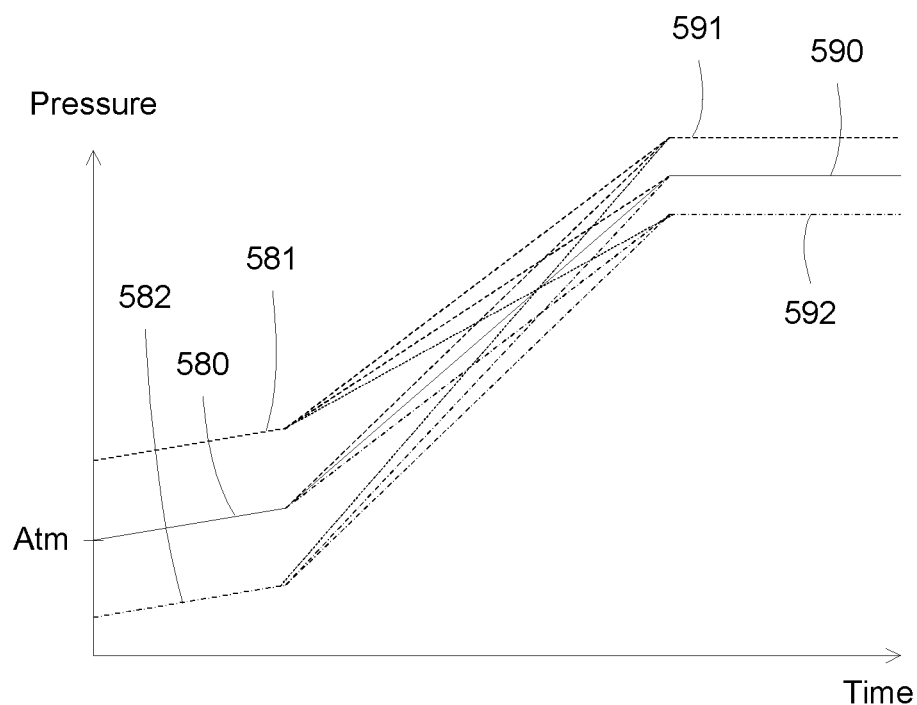

FIGS. 5A-5B illustrate operating configurations for an air compression cavity according to some embodiments. In FIG. 5A, a tire mold segment 510 can have an air compression cavity 540 embedded in the tire mold segment 510. The air compression cavity 540 can have an outlet 542 connected to an outside ambient. A valve assembly 570 can be coupled to the outlet 542, for example, to have access to the air compression cavity 540. A vacuum system 577 can be coupled to the valve assembly 570, for example, to assist in displacement of air from the mold segment into a compression cavity. Another system 575, such as a pressurized fluid or a compressor assembly, can also be coupled to the valve assembly 570, for example, to provide a fluid, such as a gas, a liquid, or a mixture of gas and liquid, to the air compression cavity 540.

FIG. 5B shows pressure curves as a function of time for different operating configurations of the tire mold. The valve assembly 570 can be closed at all time. The air compression cavity 540 can be at an atmospheric air pressure. During the tire making process, air inside the tire mold can be evacuated from the tire mold and stored in the air compression cavity 540, increasing the air pressure 580 of the air compression cavity 540. When the rubber material is completely filled the tire mold, the air pressure 590 in the air compression cavity can become constant, e.g., all the air in the tire mold has been stored in the air compression cavity. The volume of the air compression cavity can be configured so that the air pressure 590 can assist in blocking the rubber material from entering the surface connection slots.

In some embodiments, the valve assembly 570 can be open to the compressor assembly 575. For example, the compressor assembly 575 can increase the pressure 581 in the air compression cavity to be above the atmospheric air pressure. The pressure increase can be small, to allow the air in the tire mold to be evacuated to the air compression cavity. The compressor can increase the final pressure 591 of the air compression cavity, for example, to better assist in blocking the rubber material from entering the surface connection slots. The compressor can provide different additional air pressure at different time, for example, to increase the initial pressure 581 to be above atmospheric pressure, and to not increase the final pressure 590 to be the same as without operating the compressor. Alternatively, the compressor can be off at the beginning, to provide an initial pressure 580 at atmospheric. The compressor can start, to bring the final pressure 591 to be above the pressure 590. Other configurations can also be used, changing the operation of the compressor to assist in evacuating the air in the tire mold, and to preventing the rubber material from entering the surface connection slots.

In some embodiments, the valve assembly 570 can be open to the vacuum assembly 577. For example, the vacuum assembly 577 can lower the pressure 582 in the air compression cavity to be below the atmospheric air pressure. The low pressure level can allow the air in the tire mold to be displaced easier to the air compression cavity. The vacuum assembly can lower the final pressure 592 of the air compression cavity. The vacuum assembly can provide different air pressure at different time, for example, to lower the initial pressure 582 to be below atmospheric pressure, and to not increase the final pressure 590 to be the same as without operating the compressor. Alternatively, the vacuum assembly can be off at the beginning, to provide an initial pressure 580 at atmospheric. The vacuum assembly can start, to bring the final pressure 592 to be below the pressure 590. Other configurations can also be used, changing the operation of the vacuum assembly to assist in displacement of air from the mold into a compression cavity.

In some embodiments, a combination of the compressor 575 and the vacuum assembly 577 can be used. For example, the vacuum assembly can start at a beginning of the tire making process, lowering the pressure 582 in the air compressor cavity to be below atmospheric pressure, to assist in displacement of air from the mold into a compression cavity. The compressor can start at an end of the tire making process, increasing the pressure 591 in the air compressor cavity to be at an appropriate pressure, to assist in blocking the rubber material from entering the surface connection slots, and to possibly facilitate the tire de-molding process.

FIGS. 6A-6C illustrate a configuration for multiple surface connection slots intersecting an air compression cavity according to some embodiments. A tire mold segment 610 can have an air compression cavity 640, which can be formed by a hollow tube 641 embedded in the tire mold segment 610. The tire mold segment 610 can have a tread pattern surface, which can include multiple tread blocks 650 separated by tread block side walls 655.

FIG. 6A shows a perspective view of the air compression cavity 640 and the surface connection slots 620. The tire mold segment and the tread pattern are omitted in this figure to show the relationship between the air compression cavity 640 and the surface connection slots 620. FIG. 6B shows a cross section view A-A', cutting along a length of a surface connection slot 620. FIG. 6C shows another cross section view B-B', cutting along a length of the air compression cavity 640. The air compression cavity 640 can be placed at an angle with the surface connection slots 620, e.g., the air compression cavity 640 and the surface connection slots 620 are not substantially parallel, so that multiple surface connection slots 620 can intersect the air compression cavity 640 with a short separation.

Figure 7A:
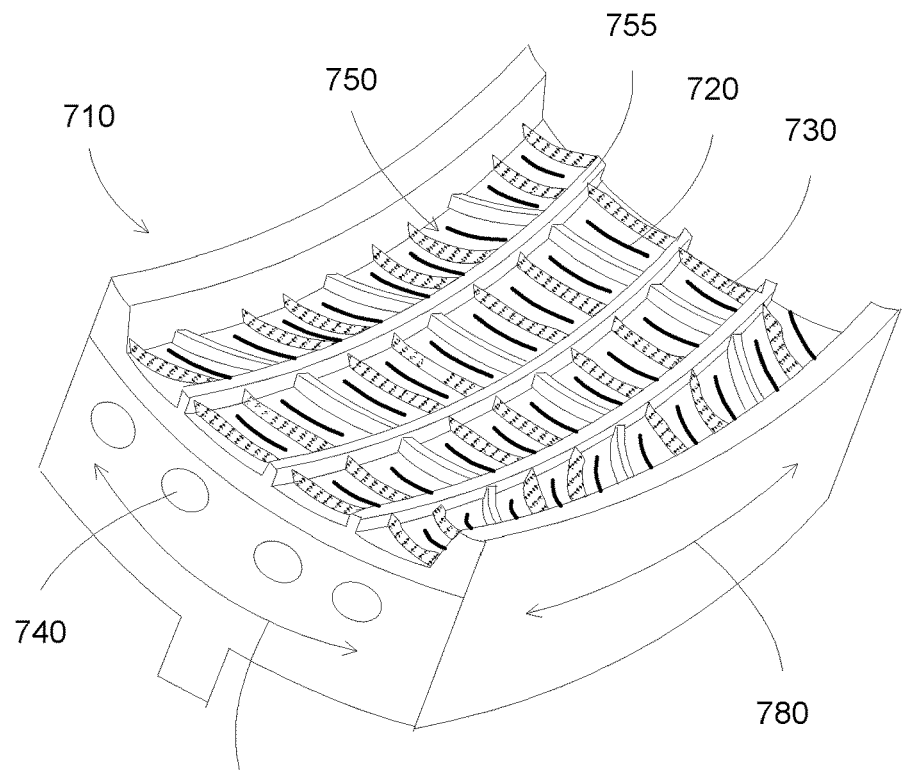
FIGS. 7A-7B illustrate a tire mold segment and a complete tire mold having an air compression cavity according to some embodiments.
Figure 7B:
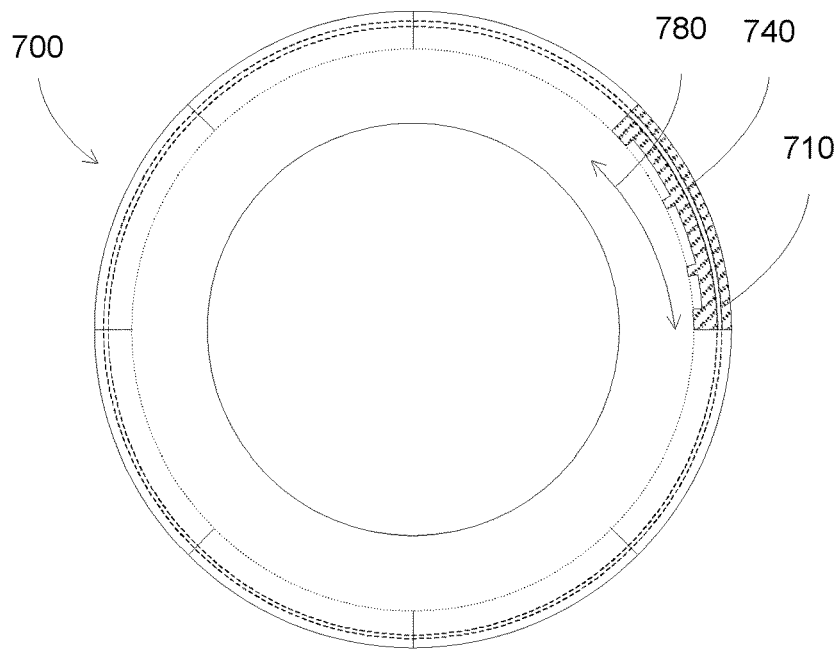

FIGS. 7A-7B illustrate a tire mold segment and a complete tire mold having an air compression cavity according to some embodiments. In FIG. 7A, a tire mold segment 710 can include multiple air compression cavities 740 passing through the tire mold segment 710. The air compression cavities can be configured to be under the tread surface of the tire mold segment, and can be configured to cross multiple tread blocks 750 of the tire mold segment. The air compression cavities can be configured to intersect multiple surface connection slots 720, which are formed in cavities formed between sipes 730 and tread block side walls 755. As shown, the air compression cavities 740 are disposed along a circumferential direction 780 of the tire 700. Other configurations can be used, such as disposing the air compression cavities along a width direction 785, e.g., across a thickness or a width of the tire mold. Other directions can also be used.

In FIG. 7B, multiple tire mold segments 710 can be assembled to form a complete tire mold 700. The air compression cavities 740 can be connected between the tire mold segments to form close air compression cavities for the complete tire mold.

Figures 8A, 8B:
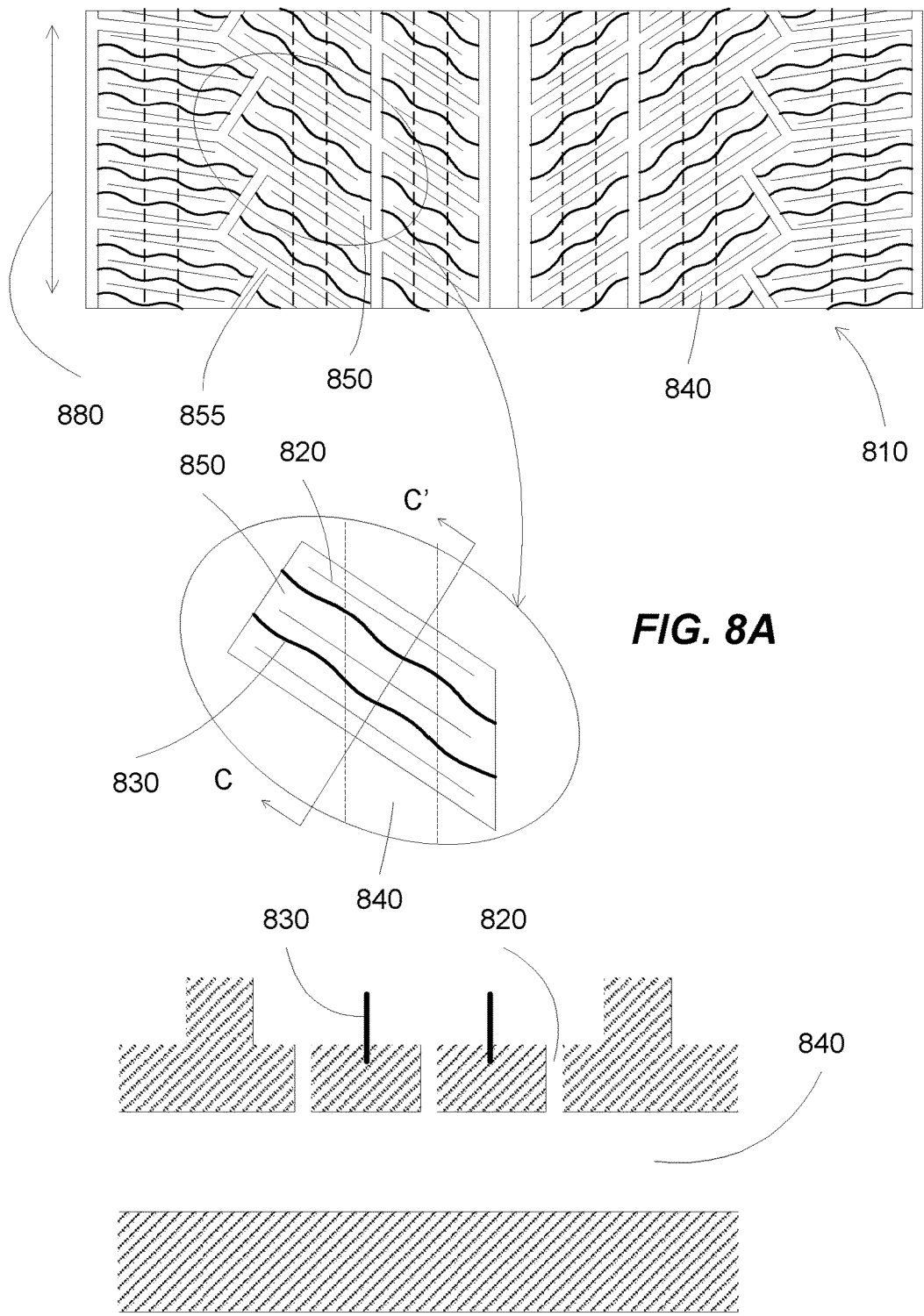
FIGS. 8A-8E illustrate a tire mold segment having air compression cavities according to some embodiments.

FIGS. 8A-8E illustrate a tire mold segment having air compression cavities according to some embodiments. FIG. 8A shows a top view, and FIG. 8B shows a cross section C-C' of a tread block 850. A tire mold segment 810 can include a tread pattern, which include multiple tread blocks 850, separated by tread block sidewalls 855. Air compression cavities 840 can run across and under the tire mold segment. The direction of the air compression cavities can be designed to intersect multiple surface connection slots 820. For example, the air compression cavities 840 can run along a circumferential direction 880 of the tire mold.

In the tread block 850, sipes 830 can run across the tread block 850, separating the tread block into multiple areas. Each area thus will need a surface connection slot 820, in order to remove the air to prevent defects in the rubber tire during the curing process. Each surface connection slot 820 can intersect the air compression cavity 840, so that the air can enter the air compression cavity 840. With the air compression cavity running across multiple tread blocks and forming an angle with the area that the air needs to be removed, the surface connection slots 820 can be cut anywhere in the tread block, and still intersecting the cavity 840.

Figure 8C:
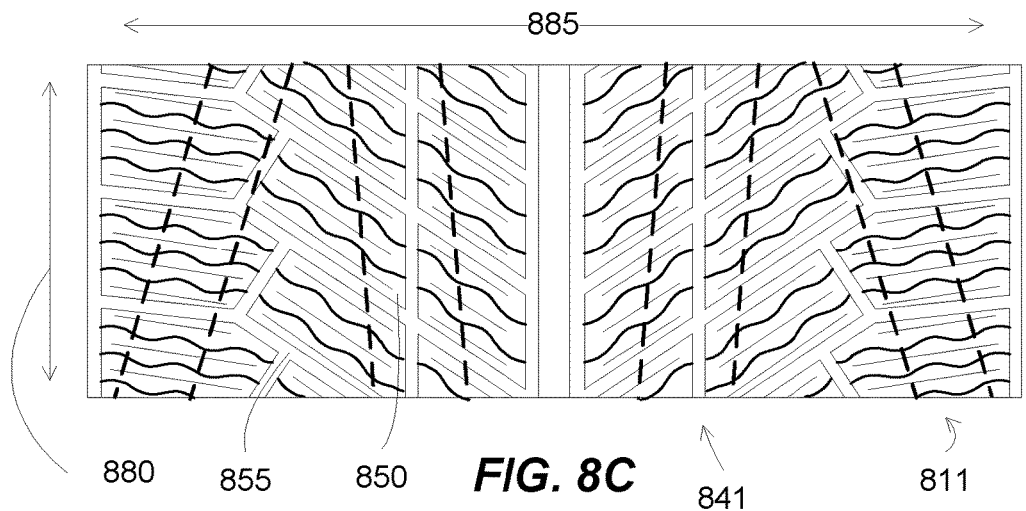
Figure 8D:
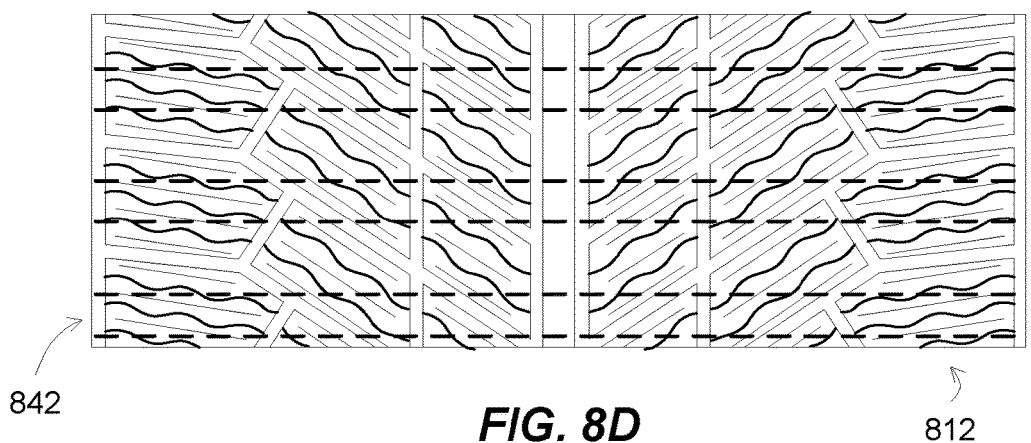
Figure 8E:
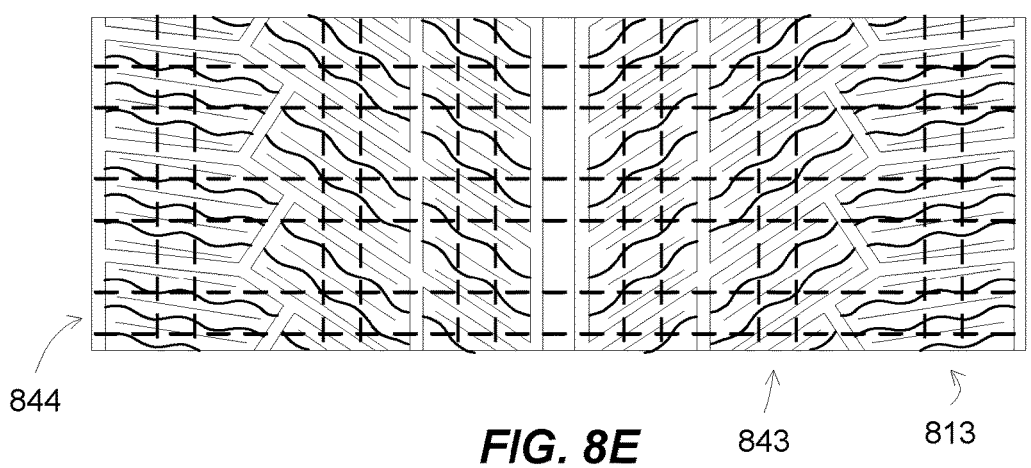

FIGS. 8C-8E show different configurations of the air compression cavities. FIG. 8C shows a tire mold segment 811 having air compression cavities 841 forming an angle with the circumferential direction 880 or with the thickness (or width) direction 885. FIG. 8D shows a tire mold segment 812 having air compression cavities 842 running across the thickness (or width) direction 885. FIG. 8E shows a tire mold segment 813 having air compression cavities 843/844 forming a net under the tread pattern of the tire mold segment, including air compression cavities 843 running along the circumferential direction 880 and air compression cavities 844 running across the thickness (or width) direction 885. Other configurations can be used.

In some embodiments, the air compression cavity 840 can have structural supports, for example, to increase structural integrity of the tire mold segment. The structural supports can be configured to allow air to pass through, for example, having conduit passages in the structural supports. Other configurations can be used, such as a metal wall hollow element, in which the metal wall can serve as structural support for the air compression cavity on the tire mold segment.

In some embodiments, surface connection slots can be used together with air compression cavities. In certain areas, conventional venting technology can be used, such as air evacuation cavity process, in which the air is evacuated to the outside ambient. In certain areas, air compression cavity process can be used, which can potentially save up to 8000 backside drilled holes in each tire mold.

In some embodiments, the air compression cavity can be connected to the tread walls of the tread blocks in a tire mold segment. A surface connection slot can be used to connect the tread walls to an air compression cavity.

Figure 9A:
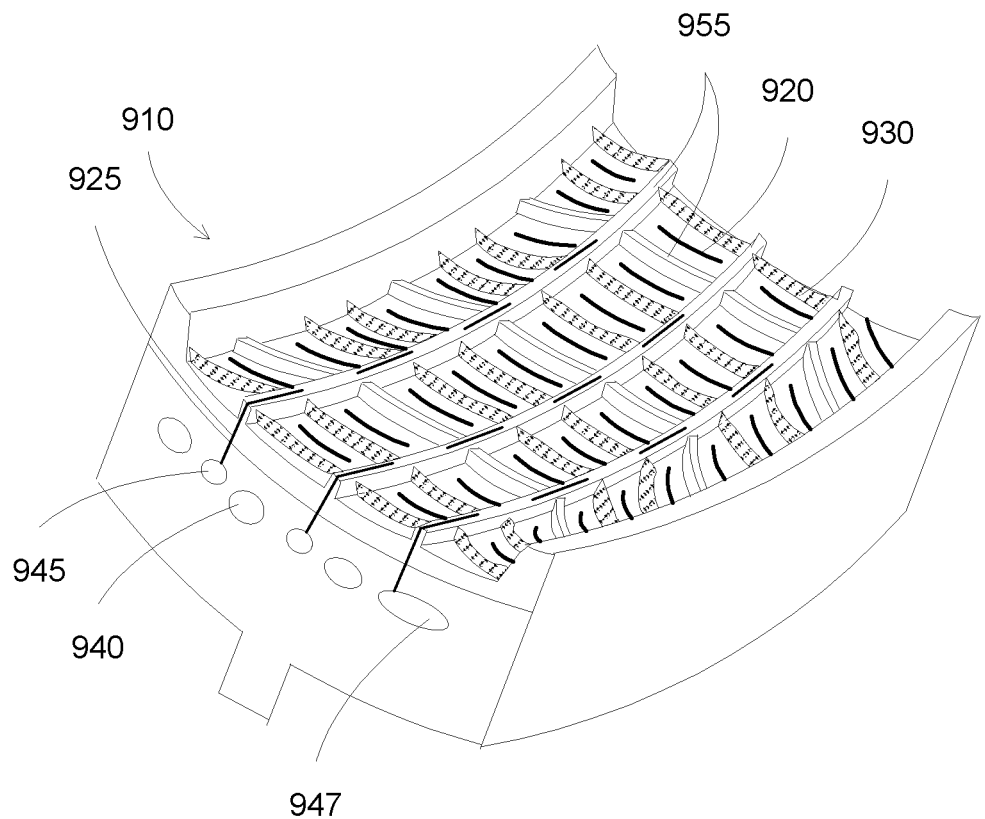
FIGS. 9A-9B illustrate a tire mold segment having an air compression cavity according to some embodiments.
Figure 9B:
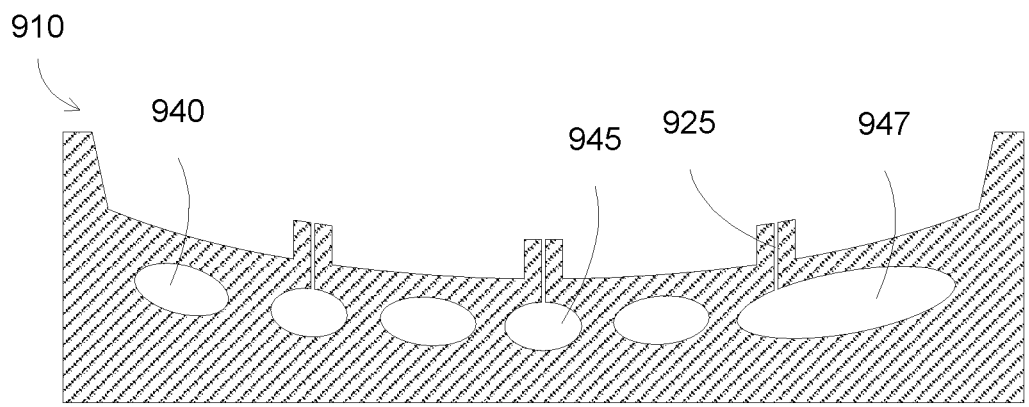

FIGS. 9A-9B illustrate a tire mold segment having an air compression cavity according to some embodiments. A tire mold segment 910 can include multiple air compression cavities passing through the tire mold segment 910. For example, an air compression cavity 940 can be configured to be connected to surface connection slots 920 for evacuating air in recesses between sipes 930 and tread walls 955. An air compression cavity 945 can be configured to be connected to surface connection slots 925 coupled to tread walls 955. An air compression cavity 947 can be configured to be connected to both surface connection slots 920 and surface connection slots 925.

In some embodiments, the present invention discloses systems and methods to improve the reliability of the tire mold process. A surface connection slot dimension can be small, such as between 10 to 300 microns, thus can be clogged, for example, due to the rubber residues in the vulcanization process. The sipes can have conduit passages, e.g., sipes having holes or lines, so that air can pass from one side of the sipes to the other side. Thus, if a surface connection slot is clogged, air can pass through the conduit passages of the sipes to enter the nearby surface connection slots.

Figure 10A:
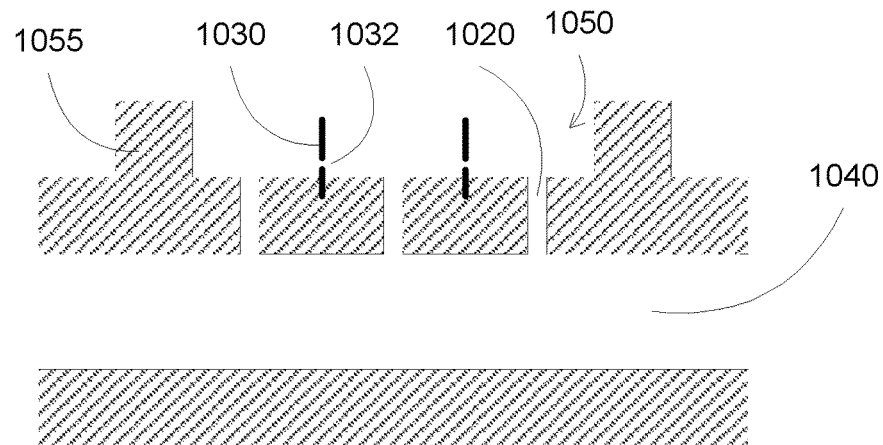
FIGS. 10A-10C illustrate a tire mold segment having sipes with a conduit passage according to some embodiments.
Figure 10B:
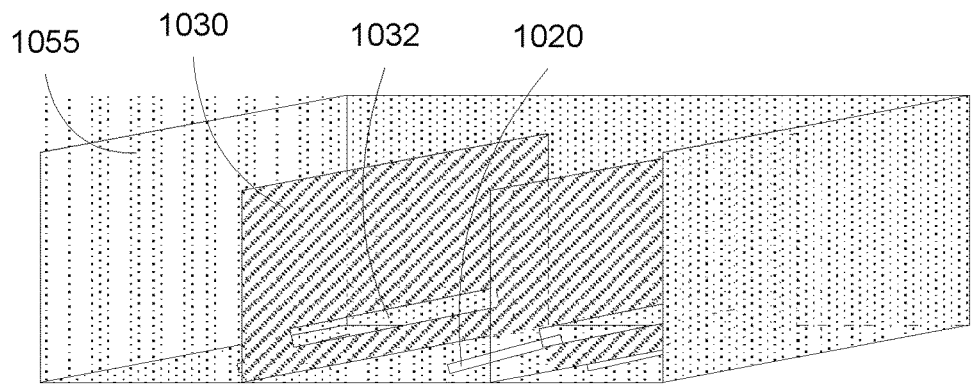
Figure 10C:
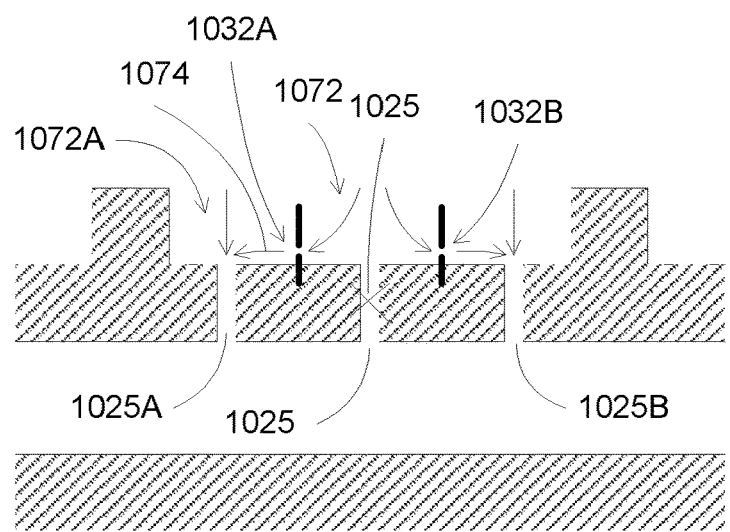

FIGS. 10A-10C illustrate a tire mold segment having sipes with a conduit passage according to some embodiments. FIGS. 10A-10B shows a cross section view and a perspective view of a tread block 1050 having sipes 1030 with conduit passage 1032. The areas defined by the sipes and the tread block sidewall 1055 all can have surface connection slots 1020 connecting to an air compression cavity 1040. As shown, the conduit passage 1032 has a shape of a slot which can be preferred to let air pass through but to prevent the rubber from entering the conduit. Other configurations can also be used, such as circular holes or elongated holes. In addition, the conduit passage 1032 can be placed close to the tread surface, such as less than 2 mm, or less than 1 mm from the tread surface.

FIG. 10C shows an operation of the air passage if there is a clog in a surface connection slot 1025. Air in area 1072 can pass through the conduit passages 1032A and 1032B to nearby surface connection slots 1025A and 1025B, respectively. For example, an air flow 1074 can start in area 1072, and pass through conduit passage 1032A to a nearby area 1072A to be removed through the nearby surface connection slot 1025A.

Figure 11A:
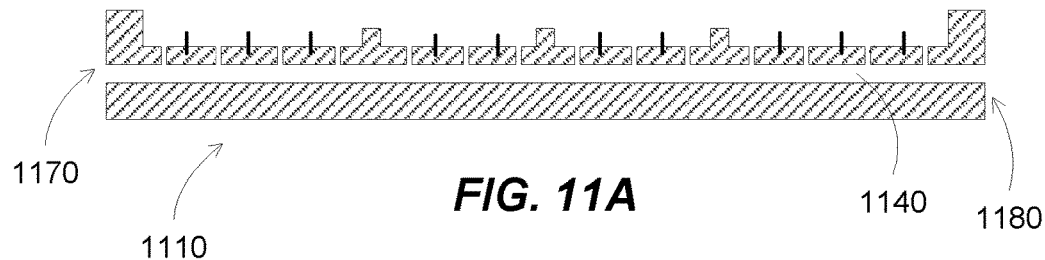
FIGS. 11A-11D illustrate configurations for tire mold segments having an air compression cavity according to some embodiments.
Figure 11B:
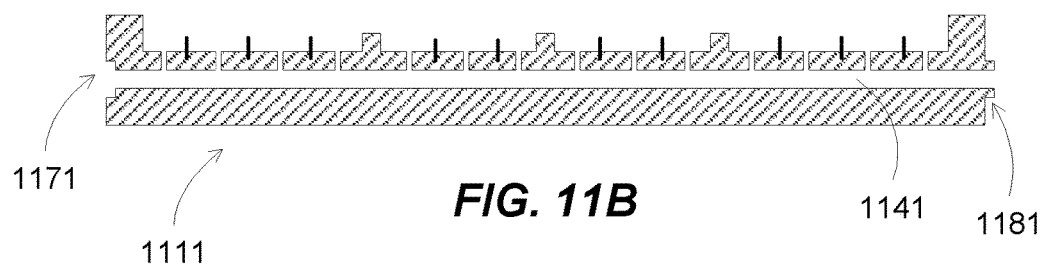

FIGS. 11A-11D illustrate configurations for tire mold segments having an air compression cavity according to some embodiments. In FIG. 11A, a tire mold segment 1110 can have an air compression cavity 1140 having open ends 1170 and 1180. The air compression cavity can be embedded in the body of the tire mold segment 1110. The tire mold segment 1110 can include multiple tread blocks 1150, together with sipes 1130 and surface connection slots 1120 for leading air to the air compression cavity 1140. In FIG. 11B, a tire mold segment 1111 can have an air compression cavity 1141 having open ends 1171 and 1181. The open ends 1171 and 1181 can have optional mating elements, for example to couple with air compression cavities of nearby tire mold segments.

Figure 11C:
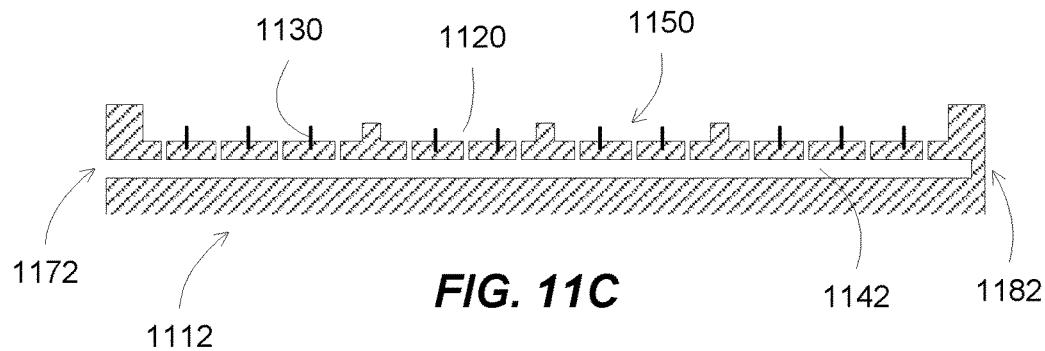
Figure 11D:
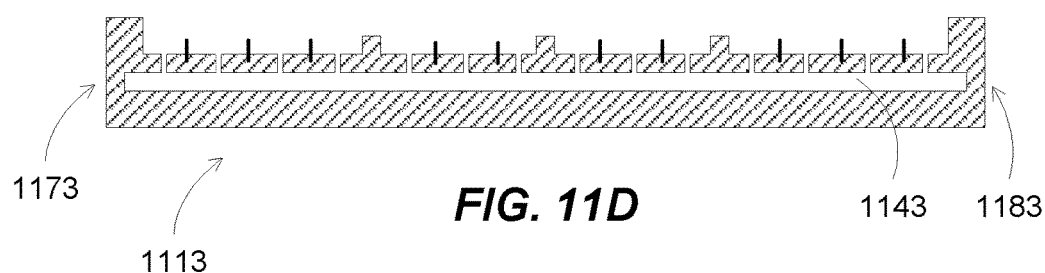

In FIG. 11C, a tire mold segment 1112 can have an air compression cavity 1142 having an open end 1172 and a close end 1182. The open end 1172 can have a mating element, for example, to couple with another air compression cavity of a nearby tire mold segment. In FIG. 11D, a tire mold segment 1113 can have an air compression cavity 1143 having close ends 1173 and 1183.

Figure 12A:
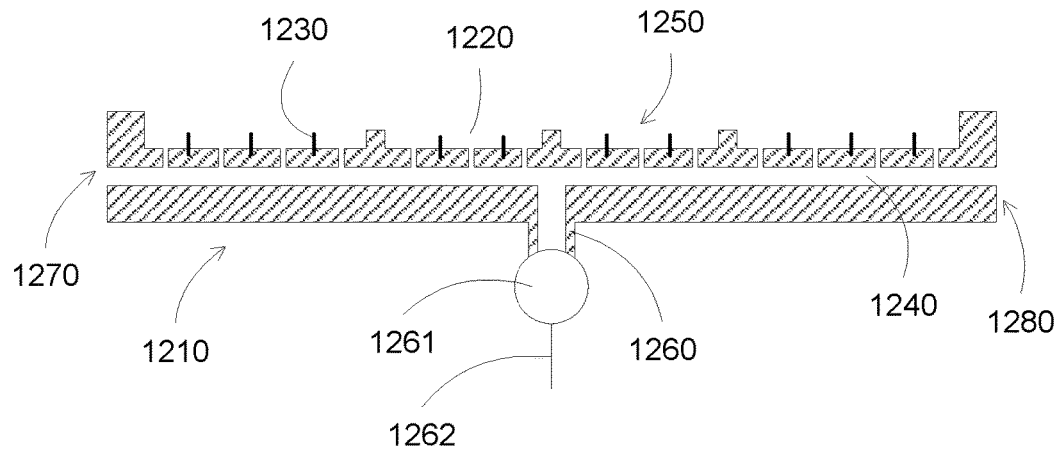
FIGS. 12A-12C illustrate configurations for tire mold segments having an air compression cavity according to some embodiments.
Figure 12B:
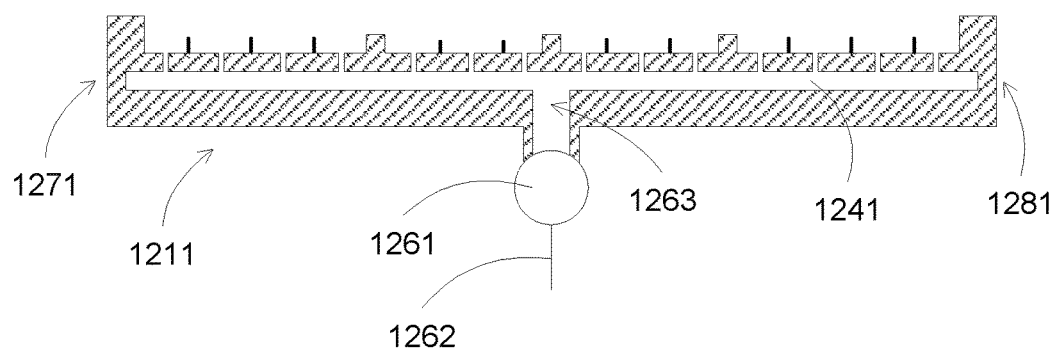
Figure 12C:
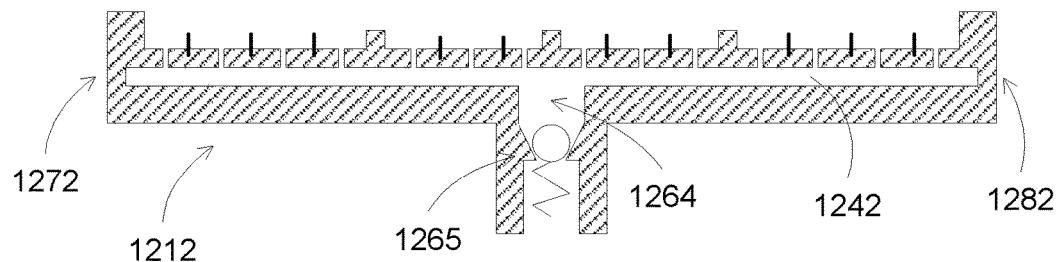

FIGS. 12A-12C illustrate configurations for tire mold segments having an air compression cavity according to some embodiments. In FIG. 12A, a tire mold segment 1210 can have an air compression cavity 1240 having open ends 1270 and 1280. The air compression cavity can be embedded in the body of the tire mold segment 1210. The tire mold segment 1210 can include multiple tread blocks 1250, together with sipes 1230 and surface connection slots 1220 for leading air to the air compression cavity 1240. The air compression cavity 1240 can also has an outlet 1260 which can be coupled to an external valve 1261. The valve 1261 can be used to control an external connection 1262 to the air compression cavity, such as for coupling to a vacuum assembly or to a compressor assembly.

In FIG. 12B, a tire mold segment 1211 can have an air compression cavity 1241 having close ends 1271 and 1281. The air compression cavity 1241 can also has an outlet 1263 which can be coupled to an external valve 1261. The valve 1261 can be used to control an external connection 1262 to the air compression cavity, such as for coupling to a vacuum assembly or to a compressor assembly.

In FIG. 12C, a tire mold segment 1212 can have an air compression cavity 1242 having close ends 1272 and 1282. The air compression cavity 1242 can also has an outlet 1264 which can be coupled to an external valve 1265. The valve 1265 can be an one-way valve, allowing an external source, such as a compressor assembly delivering pressured air, to be coupled to the air compression cavity, while preventing air in the tire mold from leaving the air compression cavity.

Figure 13A:
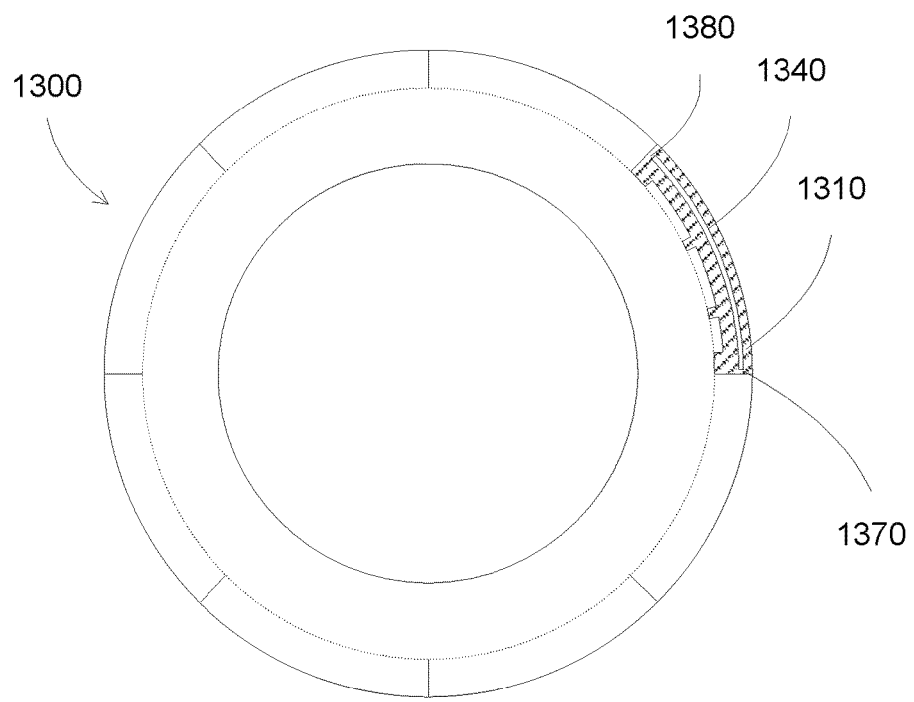
FIGS. 13A-13B illustrate complete tire mold configurations according to some embodiments.
Figure 13B:
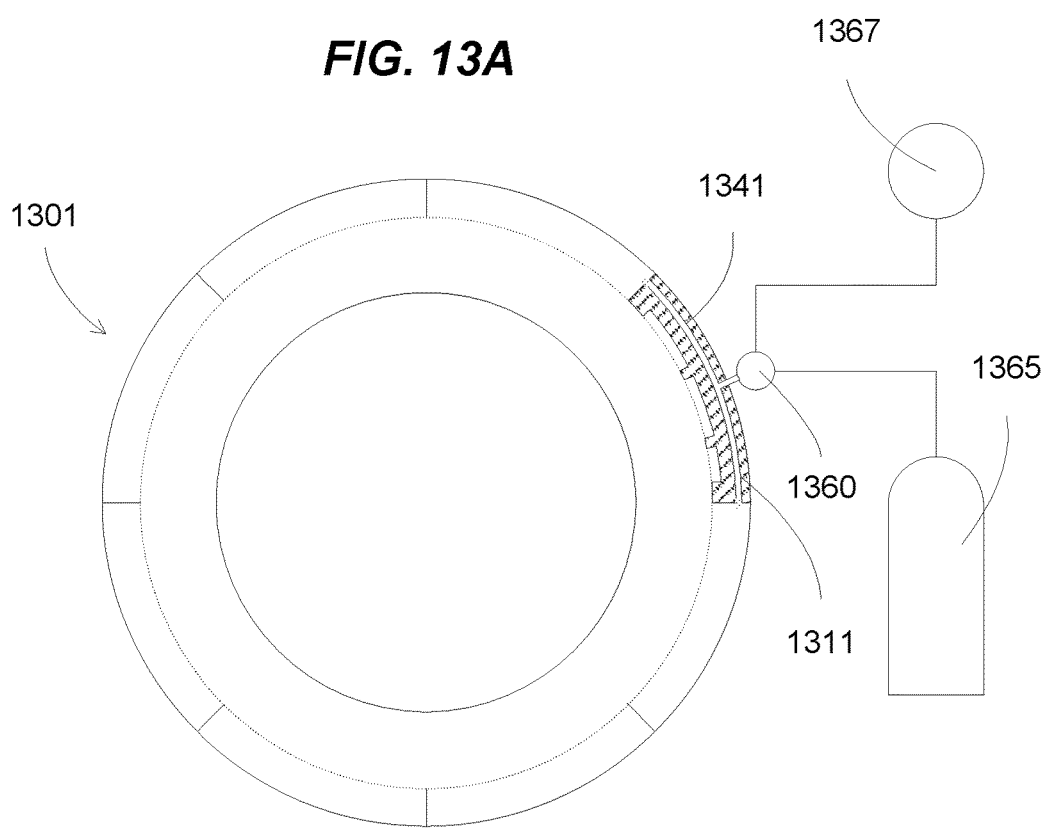

FIGS. 13A-13B illustrate complete tire mold configurations according to some embodiments. In FIG. 13A, a complete tire mold 1300 can include multiple tire mold segments 1310. The tire mold segment 1310 can have air compression cavities 1340 having close ends 1370 and 1380. Thus, each tire mold segment can have close air compression cavities. In FIG. 13B, a complete tire mold 1301 can include multiple tire mold segments 1311. The tire mold segment 1311 can have air compression cavities 1351 having open ends, together with a middle opening, which can be coupled to a valve 1360. Thus, the air compression cavities can be connected together, and one valve can be used a complete circumferential air compression cavity that includes multiple air compression cavities from the mold segments. In some embodiments, the air compression cavities can be cross linked, so that one valve can be used for multiple circumferential air compression cavities. A vacuum assembly 1367 and/or a cylinder of pressurized fluid 1365 (e.g., compressed gas) can be coupled to the valve 1360, for example, to control the pressure of the air compression cavity 1341 or to clean the air compression cavity 1341.

Other configurations can be used, for example, tire mold segments having two close ends, an open end and a close end, or a mismatch of different configurations of tire mold segments.

The tire mold can be used for curing rubber materials for making a tire, with the air compression cavity assisting in preventing irregularities in the cured tire surface that can have the shape of the respective air bubble in the tire and in preventing the rubber materials from entering the surface connection slots in the tire mold.

Multiple tire segments can be assembled to form a complete tire mold, which includes a complete circumferential mold for making a round tire. The complete tire mold is open, e.g., the tire mold segments are placed apart for each other. A green tire can be placed in the open tire mold. The green tire can be a tire without the tire tread, e.g., a tire that is formed by mechanically assembling layers of rubber materials around reinforced meshes. The tire mold then can be closed, e.g., the tire mold segments are pushed against each other to form a complete circumferential mold around the green tire.

The green tire can be heated and pressurized to get the tread pattern on the tire mold to be transferred to the tire surface. The air in the tire mold will be evacuated during the expansion of the green tire to the mold tread surface, which will push the air to the surface connection slots, e.g., the slots that are connected to the air compression cavity.

In some embodiments, to assist in the evacuation of the air in the tire mold, in a beginning stage, the air compression cavity can be coupled to a vacuum assembly, for example, through a valve connected to the air compression cavity. The valve can be close after a period of time. The pressure in the air compression cavity can be sub-atmospheric, such as below 0.9 or below 0.5 atmospheric pressure.

In some embodiments, the vacuum assembly can stop after an initial time, e.g., the valve connecting to the air compression cavity can be closed after the initial time. Alternatively, the vacuum assembly does not start at all, or the valve is always closed. The evacuation of the air inside the tire mold can occur only due to the pushing of the green tire toward the tread pattern of the tire mold. Since the air compression cavity is isolated from the outside ambient, the pressure in the air compression cavity can increase during the expansion of the green tire. The more the green tire approaches the tread pattern, the more the air will be evacuated to the air compression cavity, and the higher the pressure in the air compression cavity becomes. The pressure in the air compression cavity can exert a counter pressure to the green tire, thus can limit the entrance of rubber and rubber debris into the surface connection slots.

In some embodiments, to assist in preventing the entrance of rubber and rubber debris to the surface connection slots, the air compression cavity can be coupled to a gas source, such as a pressurized cylinder or a compressor, for example, through a valve connected to the air compression cavity. The valve can be close after a period of time. The pressure in the air compression cavity can be regulated to optimize the blockage of rubber and rubber debris to the surface connection slots. The pressure of the air generated from the gas source can be higher than atmospheric pressure, such as between 1 and 2 bar pressure.

In some embodiments, the application of the vacuum assembly and the gas source can be controlled to optimize the tire curing process. During a beginning stage of the expansion of the green tire, e.g., when the green tire starts to expand, a low pressure can be applied to the air compression cavity, for example, by the vacuum assembly, to assist in displacement of air from the mold into a compression cavity. During an end stage of the expansion of the green tire, e.g., when the green tire has reached the tread pattern surface of the tire mold, a high pressure can be applied to the air compression cavity, for example, by the gas source, to assist in preventing the rubber or rubber debris from contaminating the surface connection slots, e.g., entering the surface connection slots and blocking the air evacuation pathway.

The tire can be cured, for example, by heating the tire mold. After the curing is completed, the tire mold can be open, e.g., the tire mold segments can be separated from each other, and the cured tire can be removed from the tire mold.

In some embodiments, after the curing process is completed, and before or during the opening of the tire mold, a gas source can be coupled to the air compression cavity. Air can travel from the gas source to the air compression cavity, to the surface connection slots. A layer of air can be formed between the mold and the cured tire. The layer of air can facilitate the de-molding process, e.g., reducing the adhesion of the cured tire to the tire mold. The pressure in the air compression cavity can be regulated to optimize the air layer formation. The pressure of the air generated from the gas source can be higher than atmospheric pressure, such as between 1 and 10 bar pressure, or between 2 and 5 bar.

In some embodiments, the gas source can continue blowing air through the air compression cavity and the surface connection slots for cleaning the surface connection slots. The pressure of the air generated from the gas source can be higher than atmospheric pressure, such as between 1 and 10 bar pressure, between 5 and 10 bar, or between 2 and 5 bar. The process can be continued with a new green tire.

Figure 14:
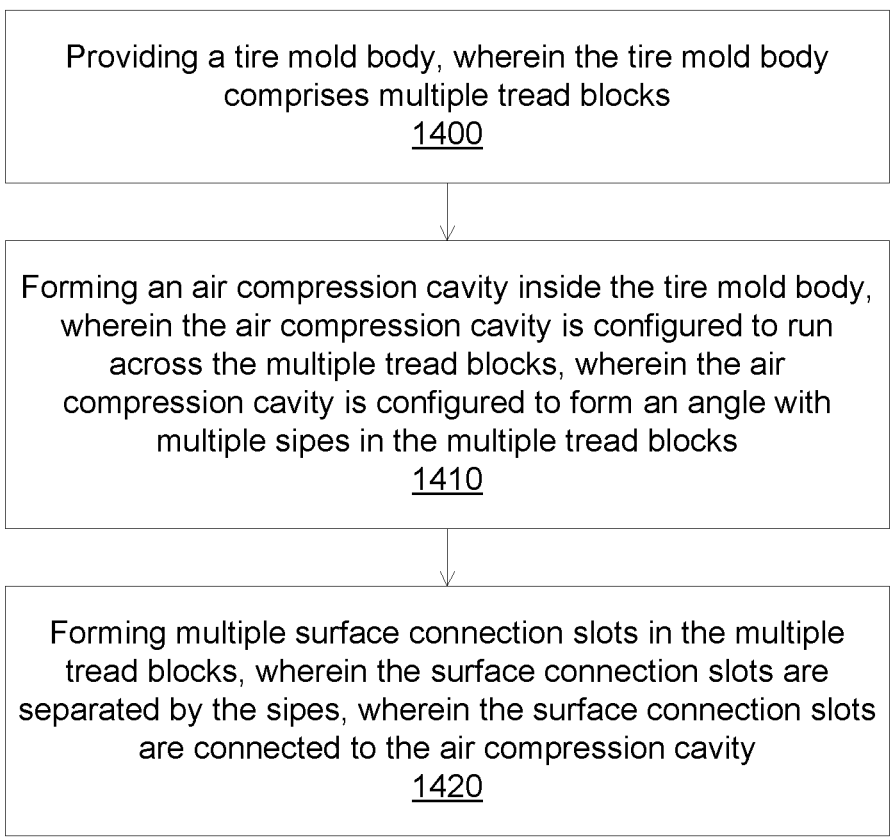
FIG. 14 illustrates a flow chart for forming a tire mold or a tire mold segment according to some embodiments.

FIG. 14 illustrates a flow chart for forming a tire mold or a tire mold segment according to some embodiments. The tire mold segment can have an air compression cavity connected to multiple surface connection slots, thus reducing the number of back side cavities. The air compression cavity can be embedded in the tire mold segment body, thus can increase the structural integrity of the tire mold segment. The air compression cavity can have structural supports, for example, pillars or walls.

Operation 1400 provides a tire mold body, such as a tire mold segment body. The tire mold body can have multiple tread blocks. Operation 1410 forms an air compression cavity inside the tire mold body, wherein the air compression cavity is configured to run across the multiple tread blocks, wherein the air compression cavity is configured to form an angle with multiple sipes in the multiple tread blocks. Operation 1420 forms multiple surface connection slots in the multiple tread blocks, wherein the surface connection slots are separated by the sipes, wherein the surface connection slots are connected to the air compression cavity.

In some embodiments, the present invention discloses methods to form tire molds or tire mold segments, and tire molds or tire mold segments generated from the methods, that include air compression cavities that can be connected to multiple surface connection slots of the tire molds. The air compression cavities can be embedded in the tire mold, and can be isolated from the outside ambient. In some embodiments, the air compression cavities can be open to the outside ambient. The opened air compression cavities can allow accesses to the multiple surface connection slots, for example, so that compressed gas, liquid, or gas/liquid mixture can be used to clean the surface connection slots from inside out. The opened air compression cavities can be closed, e.g., isolated from the outside ambient, by a valve assembly. The valve assembly can include an one way valve, for example, to pressurizing the cavities.

The methods to form tire molds or tire mold segments can include cast processes, milling processes, or additive manufacturing processes to form the tire molds or tire mold segments. A negative mold body can be formed, including a surface having a tread pattern. The negative mold body can be cast, using melted aluminum (or another suitable metal alloy) to be poured around a positive model of the tire tread surface. In direct milling, a negative tread pattern can be directly milled into, for example, an aluminum or steel segment body. In some embodiments, the tire mold segment can include multiple portions, such as a support body portion with a separate tread pattern portion. The support body portion can be milled or cast. The tread pattern portion can be inserted into the support body portion as a separate layer. The tread pattern portion can be made by, for example, direct milling, casting or alternatively by additive manufacturing technologies such as 3D printing, or selective laser melting.

One or more compression cavities can then be formed in the negative mold body. The compression cavities can be prepared so that the compression cavities can be formed together with the negative mold body. For example, in cases of a cast mold, the compression cavities can be generated by inserting a suitable cavity such as a tube or a profile on top of the model prior to the casting process. Alternatively a lost core can be used. A conduit can be formed in the mold body after the curing process, which can function as the compression cavity.

The compression cavities can also be formed after forming the negative mold body. For example, in cases of a milled mold, the compression cavities can be generated by milling an open cavity along a side of the mold body. In cases of a mold body having multiple portions, the compression cavity can be created by either milling an open cavity on the rear side of the tread pattern portion, and/or by milling an open cavity in the support body portion. A compression cavity can be formed after mounting the tread pattern portion onto the support body portion.

In some embodiments, the volume of the compression cavity can be adapted to the air volume that is displaced by the tire size cured in the mold. For example, the compression volume can be directly proportional to the air volume inside the closed tire mold, to build up a slight counter pressure in the compression cavity to limit rubber from possibly entering into the surface connection slots.

Surface connection slots can then be made to connect the compression cavities to the tread surface. The connection slot can be as narrow as possible, for example between 10-300 microns. This is for example achieved by using a liquid-jet laser process as described in U.S. Pat. No. 8,859,988, which is hereby incorporated by reference in its entirety. Similar to a mechanical milling process, the liquid-jet laser passes over the tread surface multiple times and removes material with each pass. This process is repeated until there is a fluid connection between the tread surface and the compression cavity. Preferentially the connecting slot is oriented in a near parallel direction to the sipes (lamellas) or other features inside the tread block. Such orientation can be useful to connect an as large as possible area in the tread block to the compression cavity. At the same time, such near parallel connection slot allows easy implementation in complex treads such as is the case for winter tires or rain tires. In such cases the sipe density is high and the sipe spacing is narrow.

FIGS. 15A-15E illustrate a process for forming a tire mold segment according to some embodiments. A cast process can have an air compression cavity embedded in a cast mold before a casting material is poured to the cast mold to form the tire mold or tire mold segment. A lost core casting process can be used, in which a sacrificial material is used, and then being removed to form an air compression cavity. A hollow element can be placed in the cast mold to form the air compression cavity.

Figure 15A:
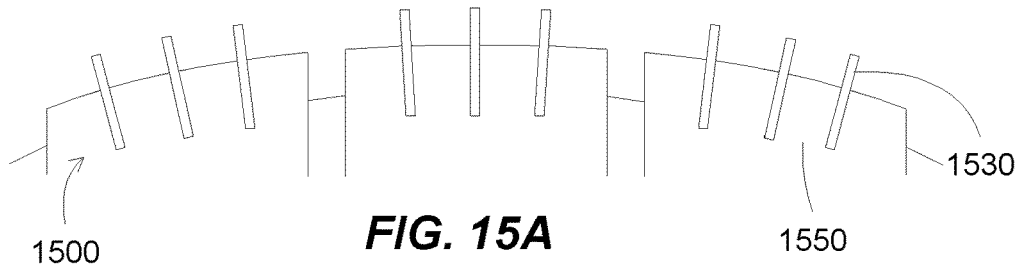
FIGS. 15A-15E illustrate a process for forming a tire mold segment according to some embodiments.

FIG. 15A shows a tire tread model mold 1500, which includes a positive tread pattern of a tire. The positive tread pattern shows the tread pattern that is similar to the tread pattern on a tire. For example, the positive tread pattern can include multiple tread blocks 1550, which are similar to the tread blocks on a tire. A difference between the tire tread model mold 1500 and a tire is the sipes 1530. The tire tread model mold 1500 can have the sipes 1530 inserted in an invert position, so that when the sipes 1530 are removed from the tire tread model mold 1500 during the casting process, a pattern of a tire can be shown. Thus the tire does not have the sipes 1530, only the indentation or image that the sipes 1530 form.

Figure 15B:
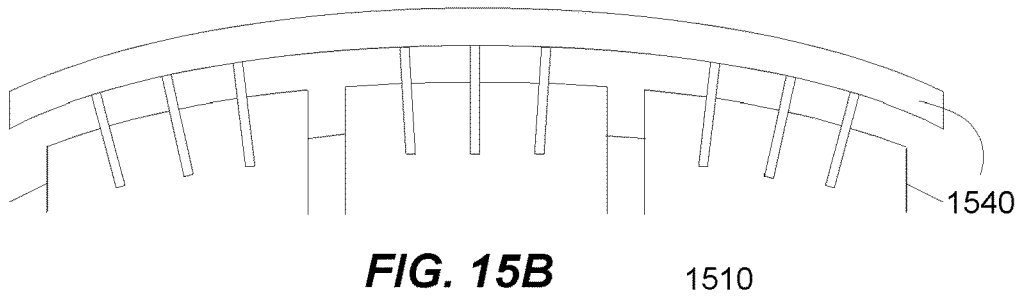

In FIG. 15B, an element 1540 is coupled to the tire tread model mold 1500, for example, attached to the sipes 1530. The element 1540 is configured to form an air compression cavity in a tire mold segment. For example, the element 1540 can include a sacrificial material, such as a lost core material that can be removed after a casting process is completed. A water soluble, salt based material, such as salt or a salt compound, can be used as a lost core material. The removal of the sacrificial material can leave a void, which can function as an air compression cavity.

Figure 15C:
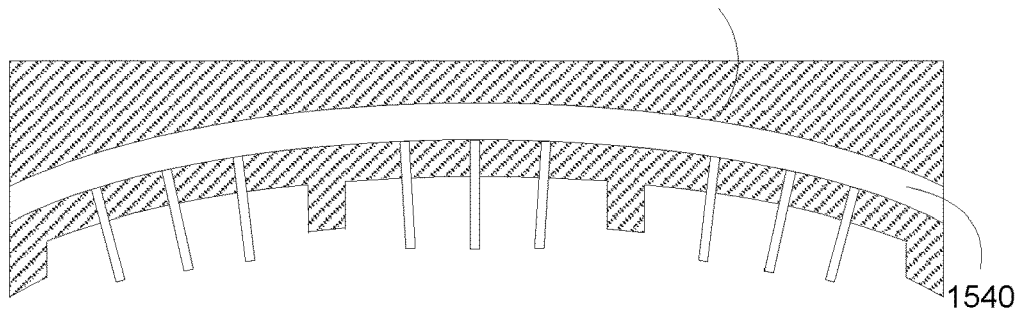
Figure 15D:
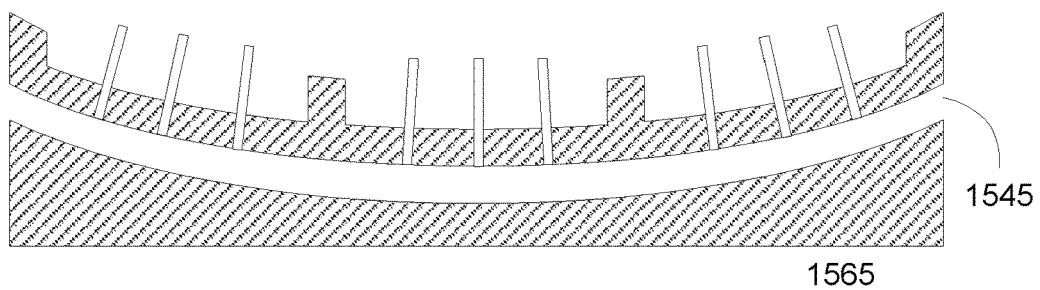

In FIG. 15C, a cast material 1510, such as aluminum or a metal alloy, can fill the tire tread model mold, covering the element 1540 and the sipes 1530. In FIG. 15D, the tire tread model mold can be removed. The element 1540 can form an air compression cavity 1545.

Figure 15E:
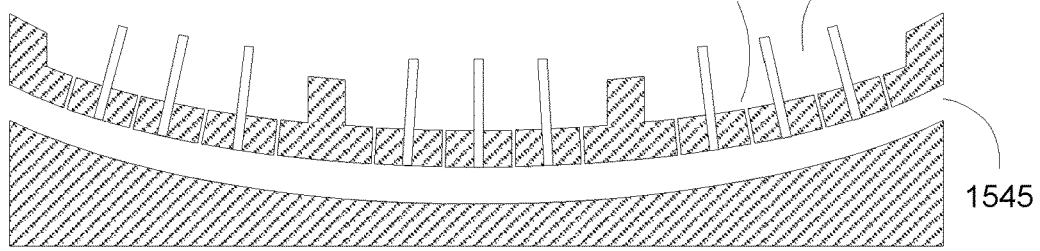

In FIG. 15E, surface connection slots 1520 can be formed, connecting the tread pattern of the mold segment to the air compression cavity 1545. For example, the tread pattern can include tread structure 1565, which can trap air during the vulcanization process, resulting in voids or defects in the rubber tire. By providing surface connection slots 1520, e.g., connecting the cavity 1565 to the air compression cavity 1545, trapped air can escape the cavity 1565 into the air compression cavity 1545. The air compression cavity 1545 can be configured to connect to multiple surface connection slots 1520, e.g., the air compression cavity 1545 can run at an angle with the cavities 1565, allowing multiple surface connection slots to intersect the air compression cavity 1545.

Different configurations for the formation of the air compression cavity can be used, instead of a lost core process. For example, a hollow element, such as a hollow tube, can be used, with the volume inside the hollow element served as the air compression cavity.

Figure 16A:
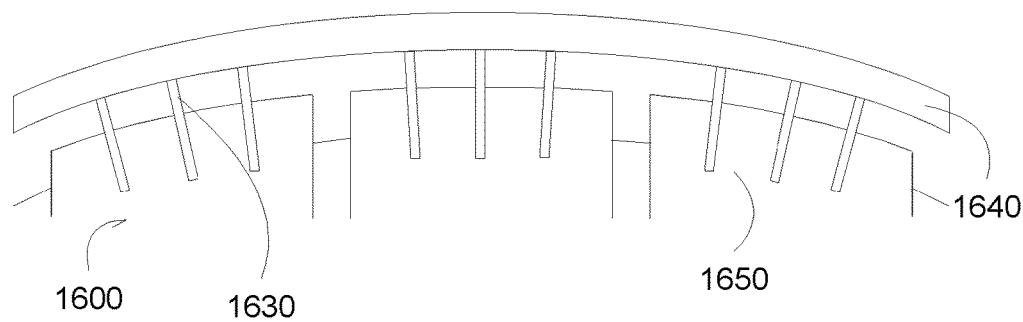
FIGS. 16A-16C illustrate a process for forming a tire mold segment according to some embodiments.
Figure 16B:
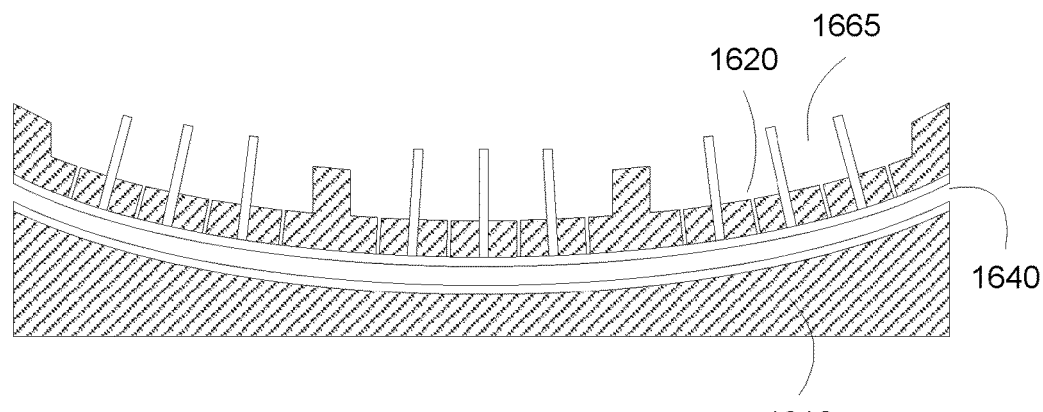
Figure 16C:
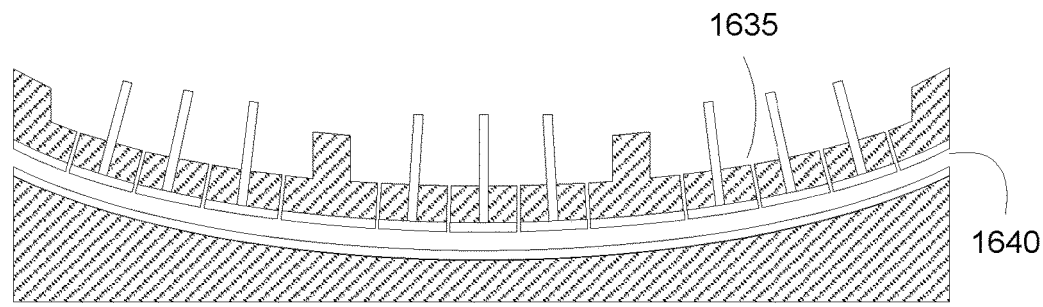

FIGS. 16A-16C illustrate a process for forming a tire mold segment according to some embodiments. The air compression cavity can be formed by using a hollow element, such as a hollow tube. The hollow volume of the hollow tube can function as an air compression cavity.

FIG. 16A shows a tire tread model mold 1600, which includes a positive tread pattern of a tire, including multiple tread blocks 1650 and sipes 1630. A hollow element 1640 is coupled to the tire tread model mold 1600, for example, attached to the sipes 1630 or to a spacer so that the element 1640 will be embedded inside the tire mold segment. The hollow volume of the hollow element can act as an air compression cavity. For example, the hollow element 1640 can include a hollow tube or conduit, having a wall surrounding an empty volume. A casting material, such as aluminum or a metal alloy, can fill the tire tread model mold, covering the outside of the hollow element 1640. After the tire tread model mold is removed, the volume inside the hollow element 1640 can form an air compression cavity.

In FIG. 16B, a cast material 1610, such as aluminum or a metal alloy, can fill the tire tread model mold, covering the hollow element 1640 and the sipes 1630. Surface connection slots 1620 can be formed, cutting through the cast material 1610. In FIG. 16C, the surface connection slots can be cut through the wall of the hollow element 1640, to connect to the air compression cavity 1635. For example, the tread pattern can include tread structure 1665, in which air can escape the tread structure 1665 into the air compression cavity 1640 through the surface connection slots 1620.

FIG. 17 illustrates a flow chart for forming a tire mold or a tire mold segment having an air compression cavity according to some embodiments. Operation 1700 provides a tire tread model mold, wherein the tire tread model mold comprises a positive tread pattern of a tire. The tire tread model mold can be made from a ceramic material, for example, to cast aluminum molds or other metallic molds. Other elements can be included in the tire tread model mold, such as sipes.

Operation 1710 attaches an element along a first surface of the tire tread model mold, wherein the element is spaced apart from the first surface, wherein the element comprises a hollow element or a sacrificial element, wherein the element is configured to form an air compression cavity. Operation 1720 casts a negative mold using the tire tread model mold, wherein the cast negative mold comprises the element and a mirror image of the positive tread pattern on a second surface of the negative mold. Operation 1730 forms connection elements from the second surface to the hollow portion of the element, wherein a dimension of the connection elements is between 10 and 300 microns.

In some embodiments, the air compression cavity can be formed with a constant and minimum separation distance from the tread surface. The short separation distance between the air compression cavity and the tread surface can allow a quick formation of the surface connection slots, e.g., the depth of the surface connection slots is the same as the separation distance between the tread surface and an inner surface of the air compression cavity. In some embodiments, the surface connection slots can be slightly deeper to ensure a safe connection and in particular a large enough contact surface in case of a round or cylindrical compression cavity.

In some embodiments, the air compression cavity is configured so that the separation distance has a minimum variation, e.g., the standard deviation of the separation distance is smallest. Spacers can be used to space the air compression cavity, for example, to control the separation distance. In some embodiments, the sipes can be configured to function as spacers.

Figure 18A:
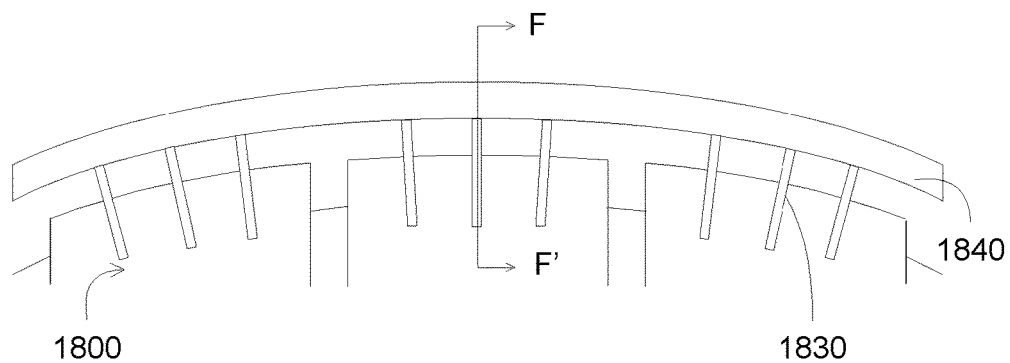
FIGS. 18A-18F illustrate configurations for forming an air compression cavity according to some embodiments.
Figures 18B, 18C:
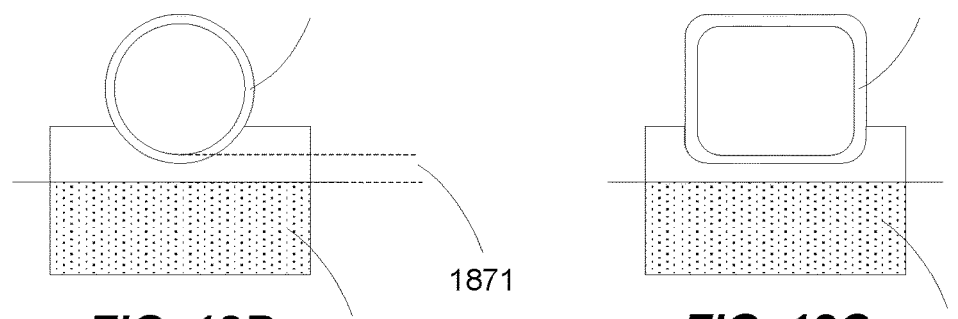

FIGS. 18A-18F illustrate configurations for forming an air compression cavity according to some embodiments. In FIG. 18A, a hollow element 1840 is coupled to the tire tread model mold 1800, for example, attached to sipes 1830 so that the hollow element 1840 will be embedded inside the tire mold segment. The hollow portion of the hollow element 1840 is configured to form an air compression cavity in a tire mold segment. FIGS. 18B and 18C show different configurations, using a cross section view F-F'. In FIG. 18B, a sipe 1831 can have a cut in the exposed portion, wherein such exposed portion can be used to affix the sipe into the cast mold. The cut can be mated with the outside circumference of the hollow element 1841. Thus the distance 1871 from the hollow element 1841 to the outside surface of the tire mold can be controlled. This distance 1871 can be the length of the surface connection slots, e.g., the distance that a cut will need to be made to connect the surface of the tire mold to the air compression cavity. FIG. 18C shows a different hollow element 1842, which is attached to sipe 1832 with a different configuration.

Figure 18D:
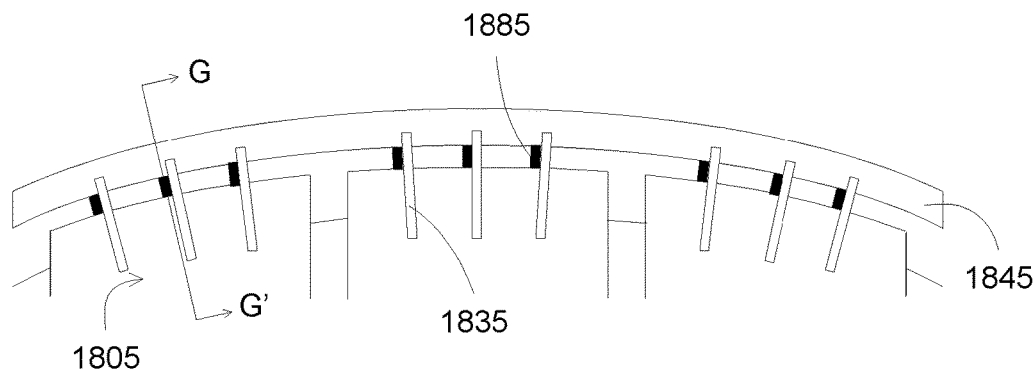
Figures 18E, 18F:
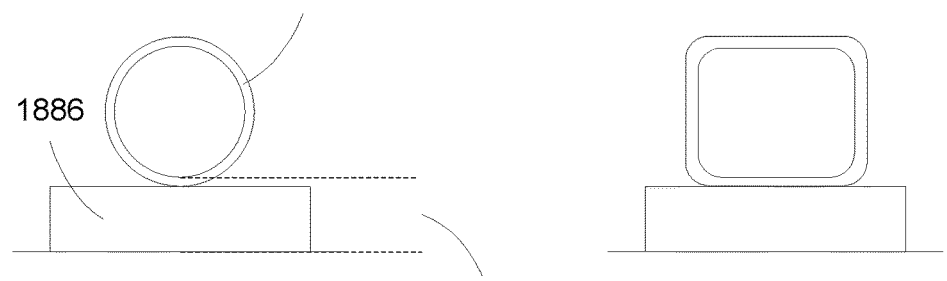

In FIG. 18D, a hollow element 1845 is coupled to the tire tread model mold 1805, for example, attached to spacers 1885 so that the hollow element 1845 will be embedded inside the tire mold segment. The hollow portion of the hollow element 1845 is configured to form an air compression cavity in a tire mold segment. FIGS. 18E and 18F show different configurations, using a cross section view G-G'. A spacer 1886 can be used to space the hollow element 1846 from the outside surface of the tire mold. Thus the distance 1876 from the hollow element 1846 to the outside surface of the tire mold can be controlled. This distance 1876 can be the length of the surface connection slots, e.g., the distance that a cut will need to be made to connect the surface of the tire mold to the air compression cavity.

In some embodiments, a milling process can be used to form the air compression cavity. After a tread pattern body is formed, sipes 1835 can be attached, and air compression cavities can be prepared before forming the surface connection slots.

Figure 19A:
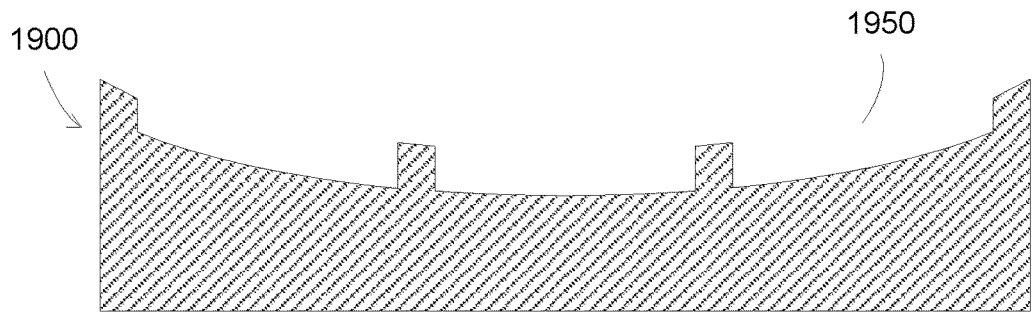
FIGS. 19A-19D illustrate a process for forming an air compression cavity according to some embodiments.
Figure 19B:
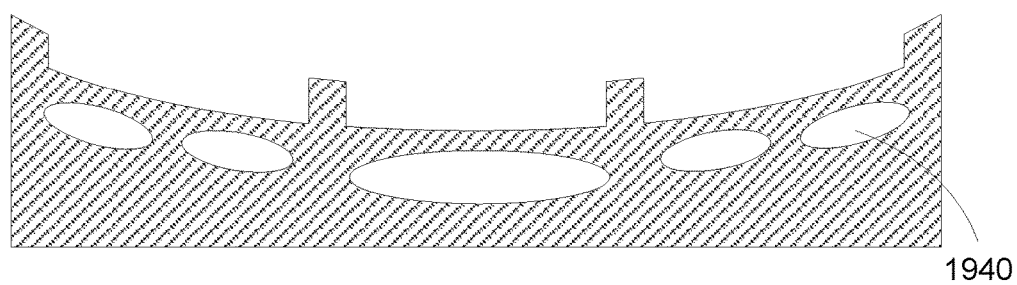

FIGS. 19A-19D illustrate a process for forming an air compression cavity according to some embodiments. In FIG. 19A, a tread pattern body 1900 can be formed, for example, by milling a block of metal such as aluminum or an metal alloy. The milling process can form tread blocks 1950 on a surface of the tread pattern body 1900. In FIG. 19B, air compression cavities 1940 can be formed in the tread block body 1900, such as by milling or drilling through the body 1900. As shown, the air compression cavities can be formed along a thickness of the tire. Alternatively, the air compression cavities can be formed along a circumferential direction of the tire, e.g., making an angle with the direction of the thickness of the tire.

Figure 19C:
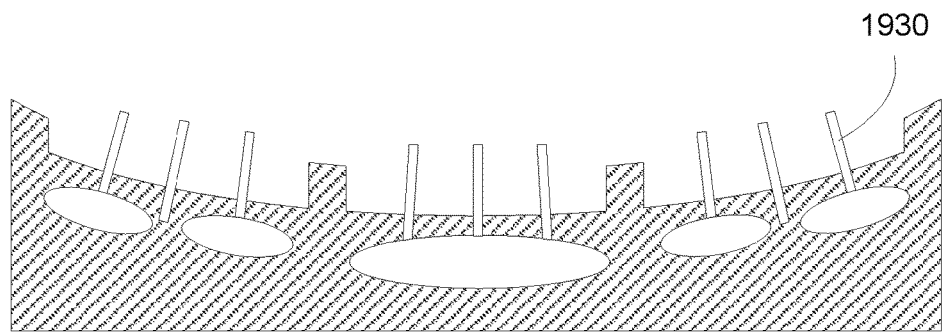
Figure 19D:
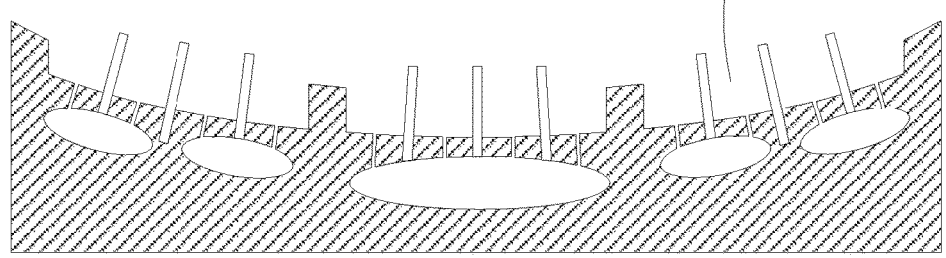

In FIG. 19C, sipes 1930 can be attached to the surfaces of the tread blocks, for example by making sipe insertion slots using a liquid-jet laser. In FIG. 19D, surface connection slots 1920 can be formed, for example, by a liquid jet guided laser system, to connect a surface of the tread blocks to the air compression cavity 1940. In some embodiments, the sipe insertion slots and the surface connection slots can be formed by a same liquid jet guided laser system.

Figure 20:
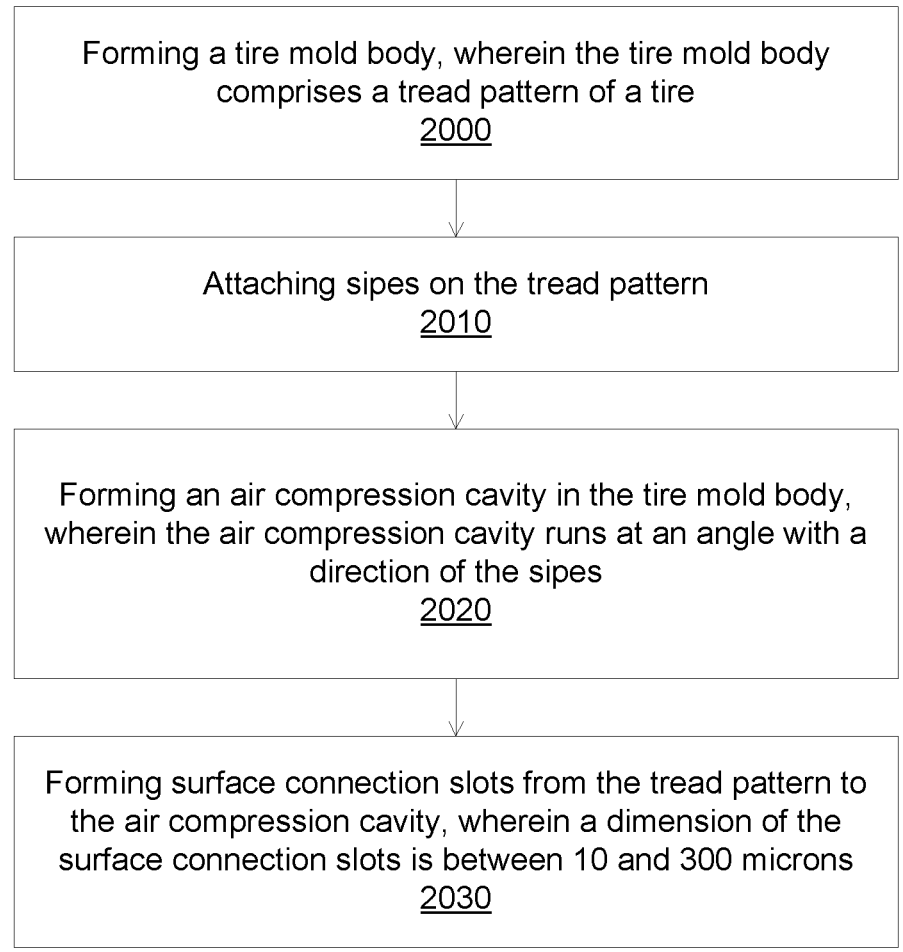
FIG. 20 illustrates a flow chart for forming a tire mold or a tire mold segment according to some embodiments.

FIG. 20 illustrates a flow chart for forming a tire mold or a tire mold segment according to some embodiments. Operation 2000 forms a tire mold body, wherein the tire mold body comprises a tread pattern of a tire. The tire mold body can be formed by a milling process. Operation 2010 attaches sipes on the tread pattern. Operation 2020 forms an air compression cavity in the tire mold body, wherein the air compression cavity runs at an angle with a direction of the sipes. The air compression cavity can be formed by a milling process. In some embodiments, the air compression cavity can be formed before attaching the sipes. In this way, the liquid-jet laser can make the connection slots and sipe slots in one effort, also the mechanical stability of the inserted sipes can be improved without post-drilling or milling a large cavity.

Operation 2030 forms surface connection slots from the tread pattern to the air compression cavity, wherein a dimension of the surface connection slots is between 10 and 300 microns In some embodiments, the present invention discloses multiple-step methods to form tire molds or tire mold segments, and multiple-part tire molds or tire mold segments generated from the methods, that include forming at least a mold support and a mold insert. A mold support can be formed, for example, by casting or by milling, as a support for the mold insert. A mold insert can be formed, by casting, milling, or by an additive manufacturing process, which can include tire tread pattern and air compression cavities.

With the two part tire mold, the air compression cavity can be prepared at an exposed surface of either the mold insert or the mold support, such as at a back side of the mold insert, instead of being embedded inside the tire mold. Thus the air compression cavity can be formed by milling, casting or additive manufacturing.

FIGS. 21A-21C illustrate a two-part tire mold segment according to some embodiments. A mold insert 2160 can be formed, having a tread pattern at a top surface, and air compression cavities 2140 at an opposite back surface. The tread pattern can include multiple tread blocks 2150, which are separated by sidewalls 2155. Sipes 2130 can be included in the mold insert. Surface connection slots 2120 can also be formed in the mold insert, connecting the top surface of the tread pattern to the back surface of the cavities 2140.

The air compression cavities can be open cavities, e.g., having exposed cavities to the outside ambient. The mold insert 2160 can be attached to a mold support 2110. The mold support 2110 can supply other sides for the air compression cavities to form closed air compression cavities, or to form air compression cavities with outlets to the outside ambient. The air compression cavities can run along multiple tread blocks, intersecting multiple surface connection slots.

In some embodiments, the mold insert 2160 can be formed by an additive manufacturing process, such as 3D printing or stereo lithography, including the tread pattern and the air compression cavity.

Figure 22A:
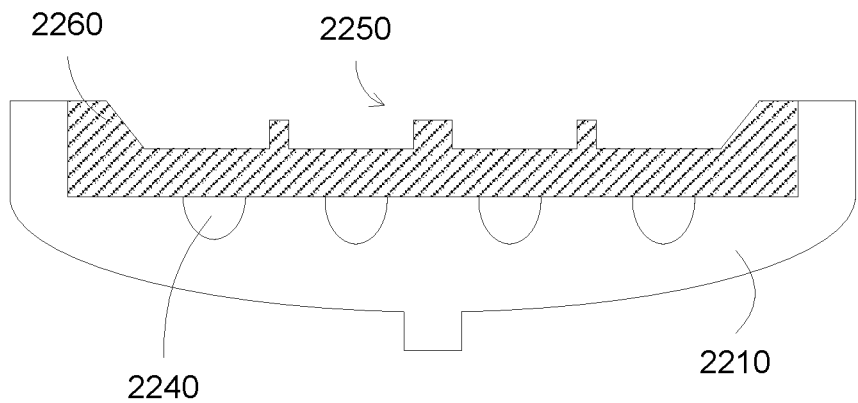
FIGS. 22A-22B illustrate different configurations for two part molds according to some embodiments.
Figure 22B:
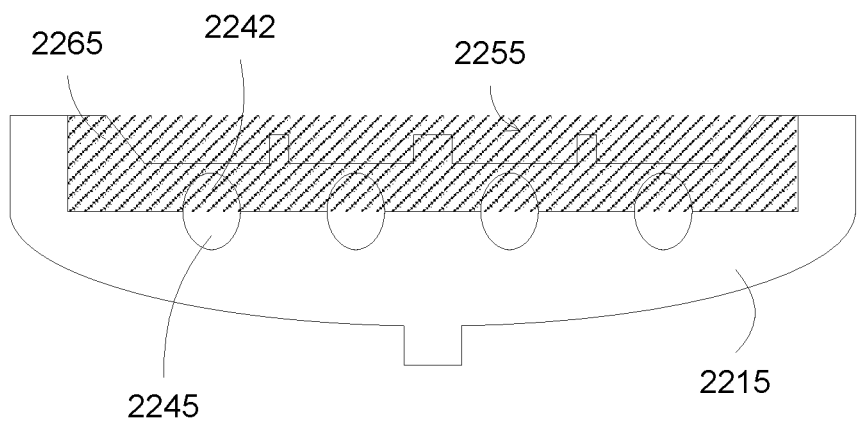

FIGS. 22A-22B illustrate different configurations for two part molds according to some embodiments. A two part mold can include a mold insert attached to a mold support. The mold insert can include an exposed tread pattern surface, for making tread blocks in a tire. The mold support can be configured to support the mold insert.

In FIG. 22A, a mold insert 2260 can have a tread pattern including multiple tread blocks 2250 on a front side. A back side can be flat, thus the mold insert can be formed with one treated surface. A mold support 2210 can have recesses 2240 on a top surface, which, after the mold insert is coupled with the mold support, can form the air compression cavities.

In FIG. 22B, a mold insert 2265 can have a tread pattern including multiple tread blocks 2255 on a front side. Recesses 2242 can also be formed on a back side. A mold support 2215 can have recesses 2245 on a top surface, which, after the mold insert is coupled with the mold support, can form the air compression cavities together with the recesses 2242 from the mold insert.

In some embodiments, other configurations can be used, such as more than two part molds, e.g., a mold support and multiple mold insert portions, or multiple mold support portions and one or more mold insert portions.

Figure 23:
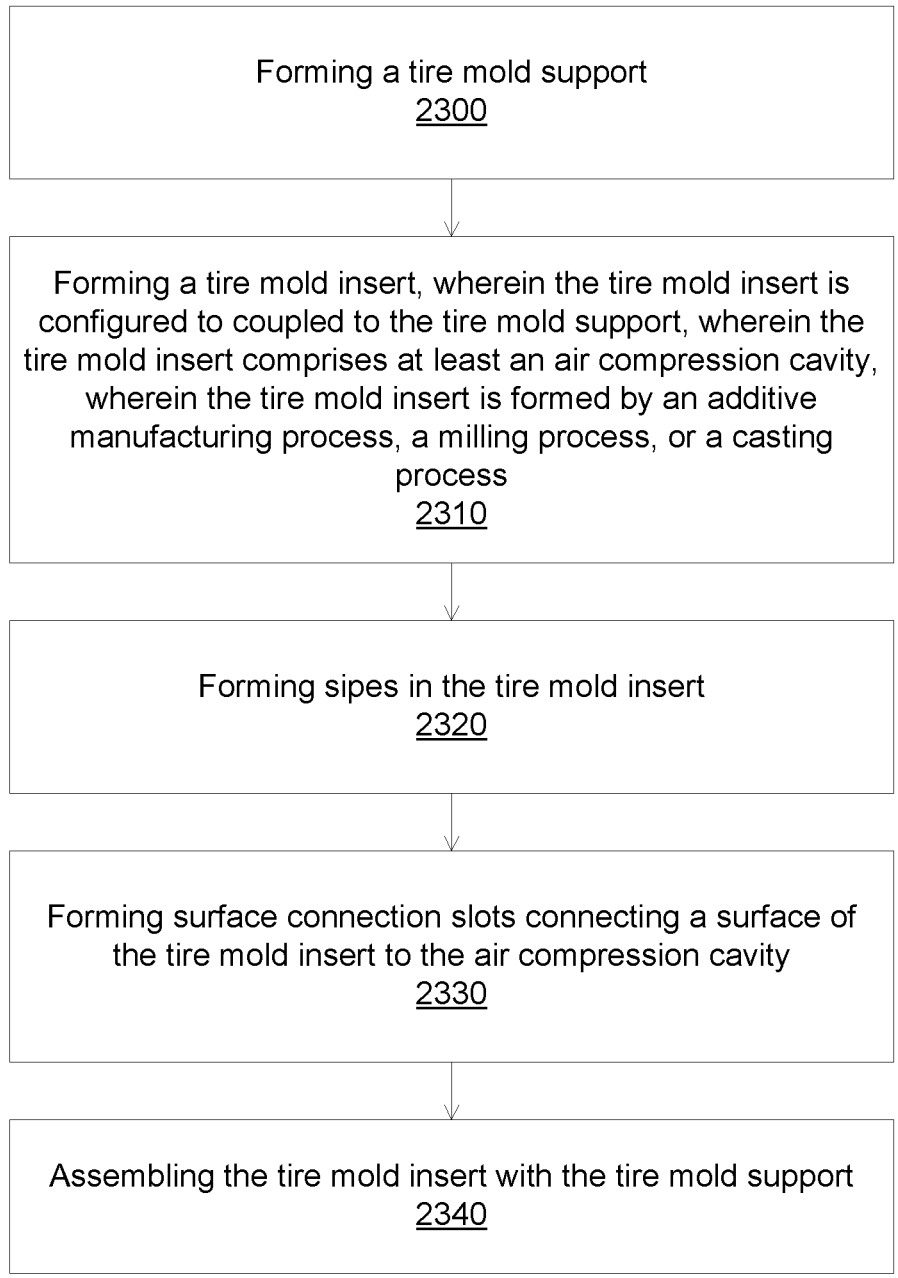
FIG. 23 illustrates a flow chart for forming a tire mold according to some embodiments.

FIG. 23 illustrates a flow chart for forming a tire mold according to some embodiments. Operation 2300 forms a tire mold support. Operation 2310 forms a tire mold insert. The tire mold insert can be configured to couple to the tire mold support. The tire mold insert can comprise at least a recess, which can function as an air compression cavity when coupled with the mold support. The tire mold insert can be formed by an additive manufacturing process, such as 3D printing. The tire mold insert can be formed by a milling or casting process. Operation 2320 forms sipes in the tire mold insert. Operation 2330 forms surface connection slots connecting a surface of the tire mold insert to the air compression cavity. The tire mold insert can be coupled to the tire mold support. Operation 2340 assembles the tire mold insert with the tire mold support.

In some embodiments, the present invention discloses methods and systems using liquid jet guided laser technology. A laser beam can be internally reflected within a liquid jet, thus providing a parallel laser beam for material processing, such as material cutting.

In some embodiments, the present invention discloses using a liquid jet guided laser system for forming the surface connection slots in a tire mold. The liquid jet guided laser system can form channels having line widths between 10 and 300 microns, which can be suitable for selective removal of air in a mold.

The length and width of the surface connection slots can be determined by the distance that the laser beam travels. For example, the laser beam can travel along a direction x to form a line having a length larger than the dimension of the laser beam inside the liquid-jet. The surface connection slot can have a width that is similar to the dimension of the laser beam inside the liquid-jet, for example, by the laser beam making a same path along the x direction.

Multiple passes can be performed to increase the depth of the surface connection slots. The surface connection slot can be cut until connected with a cavity. The surface connection slot and the cavity can be configured so that they are fluidly connected after the formation of the surface connection slot. The cavity can provide a thinner thickness of the object at the surface connection slot location, thus can reduce the depth of the surface connection slot, since the surface connection slot only needs to connect to the cavity instead of cutting through the object.

The liquid jet guided laser system can generate surface connection slots having different sidewall profiles. A rotating mechanism can allow the laser beam to cut through the material at different angles. For example, the laser beam can be perpendicular to the surface of the material, cutting through the material at a normal angle. The laser beam can form an angle with the normal direction of the material surface, cutting through the material at an angle. In addition, the depth of the cut can be controlled, for example, by running the laser beam at a slow speed or for more iteration. Thus the sidewall of the angled cut can be controlled through the depth of the laser cut.

An x-y mechanism can also be coupled to the liquid guided laser beam, which can move the laser beam in any directions to form the patterns. Together with the rotating mechanism, the laser beam can generate different depth profile patterns, including inverse taper shaped cut patterns (e.g., the opening at the surface of the material is larger than the opening at the bottom of the laser cut), taper shaped cut patterns (e.g., the opening at the surface of the material is smaller than the opening at the bottom of the laser cut), and other sidewall profiles. Multiple parameters of a liquid jet guided laser beam can be varied to achieve a surface connection slot having a sidewall pattern. The parameters can include a linear speed, a rotating speed, a power, and a number of passes.

In some embodiments, the present invention discloses methods and systems using a liquid jet guided laser system for forming structures having different profiles. For example, the bottom of a structured cut by a liquid jet guided laser system can be flat. In addition, other patterns can be formed, such as a concave or convex bottom surface, which can be generated, for example, by varying the speed of the laser beam, by varying the angle of the laser beam toward the object surface, by varying a power of the laser beam, or by varying a number of passes through the cut.

For example, a slow speed portion can generate a deeper cut portion, and a higher speed portion can generate a shallower cut portion. Alternatively, a higher power portion can generate a deeper cut portion, and a lower power portion can generate a shallower cut portion. Also, different number of passes can form different profiles. For example, to form a deeper cut, a higher number of passes can be made. At a top portion, the laser beam can run from one end to the opposite end. At an intermediate portion, the laser beam can run from one end to a middle of the cut length. Thus the opposite end can have a less number of passes that the laser beam cutting through. At a bottom portion, the laser beam can run a small middle portion, thus this middle portion can have a highest number of laser passing through.

In some embodiments, the present invention discloses a liquid jet guided laser system for generating channels having different depth profiles. An energy modulator or a moving speed modulator can be coupled to the laser system to allow the laser beam to cut through the material at different depths. For example, a lower energy laser beam or a laser beam moving at a faster speed can form a channel having shallow depth while a higher energy laser beam or a laser beam moving at a slow speed can form a channel having deeper depth. A continuous changing profile of speed or energy can form a smooth depth profile.

In some embodiments, the present invention discloses methods and systems using liquid jet laser based processes to form surface connection slots in a mold, such as a mold for making tires or a mold for making shoes. In liquid-jet guided laser technology, a laser beam is guided in a liquid jet flow through internal reflection. The laser beam and the liquid jet are coupled through a coupling unit, which includes a chamber for accepting a liquid flow. The coupling unit can also include a nozzle, which is attached to one end of the chamber, for directing the liquid flow to form a liquid jet. The coupling unit can also include a laser protection window, which can separate the dry environment of the laser beam with the liquid environment of the liquid jet.

Figure 24:
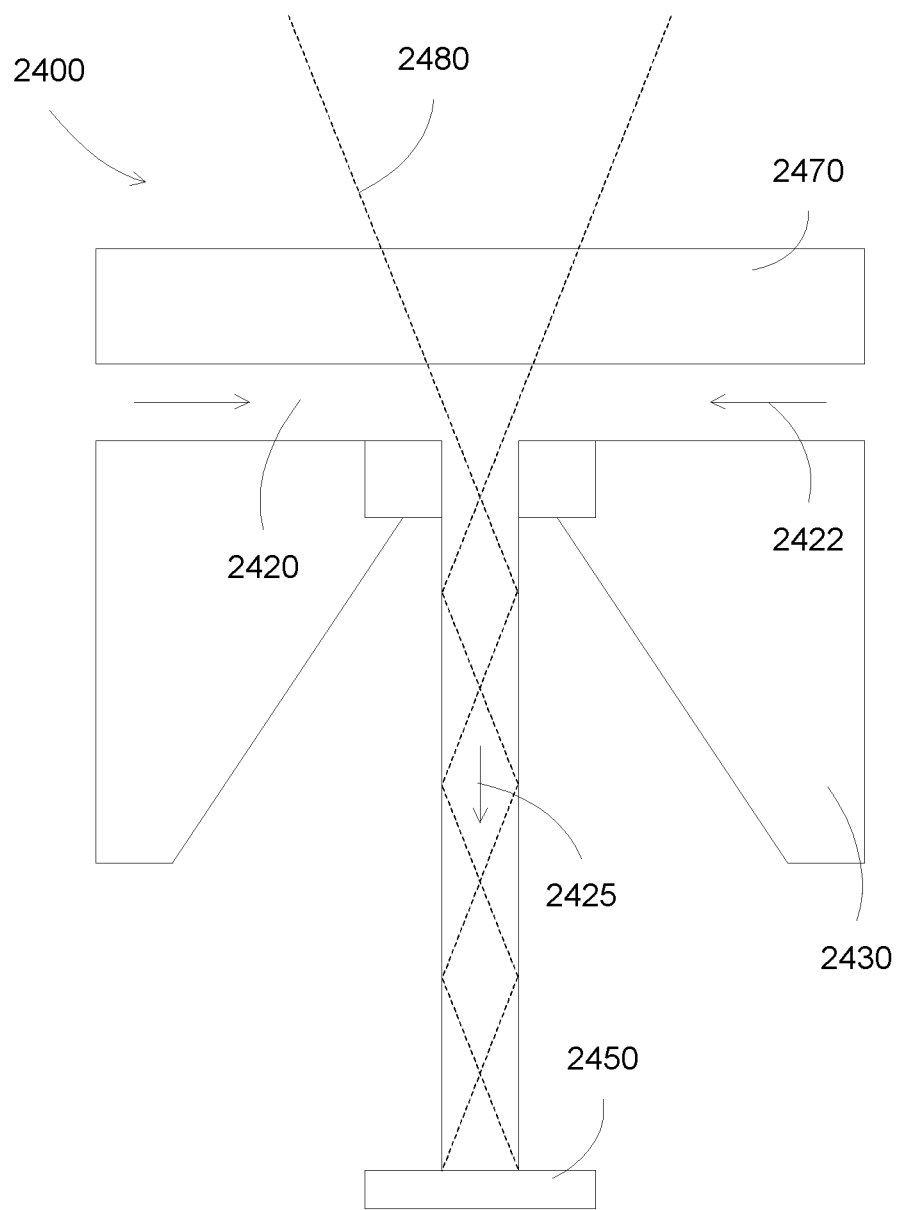
FIG. 24 illustrates a liquid jet guided laser system according to some embodiments.

FIG. 24 illustrates a liquid jet guided laser system according to some embodiments. The liquid jet guided laser system 2400 can include a chamber 2420, which is configured to guide a liquid flow 2422. The chamber 2420 can have the shape of a disk, with an inlet at an peripheral portion to accept a liquid input. The chamber 2420 can include an opening for direct the liquid flow to form a liquid jet 2425. At one side of the chamber 2420 is a nozzle 2430, which includes a nozzle stone. The nozzle 2430 can be used to control the size of the liquid jet 2425. The nozzle 2430 can be used to guide and protect the liquid jet.

The liquid jet guided laser system 2400 can include a protection window 2470, which can form an opposite side of the chamber 2420. A laser beam 2480 can be focused on the liquid jet 2425. The laser beam can be confined in the liquid jet due to internal reflection. The liquid jet guided laser beam can be used to cut lines or holes in workpiece 2450.

Figure 25A:
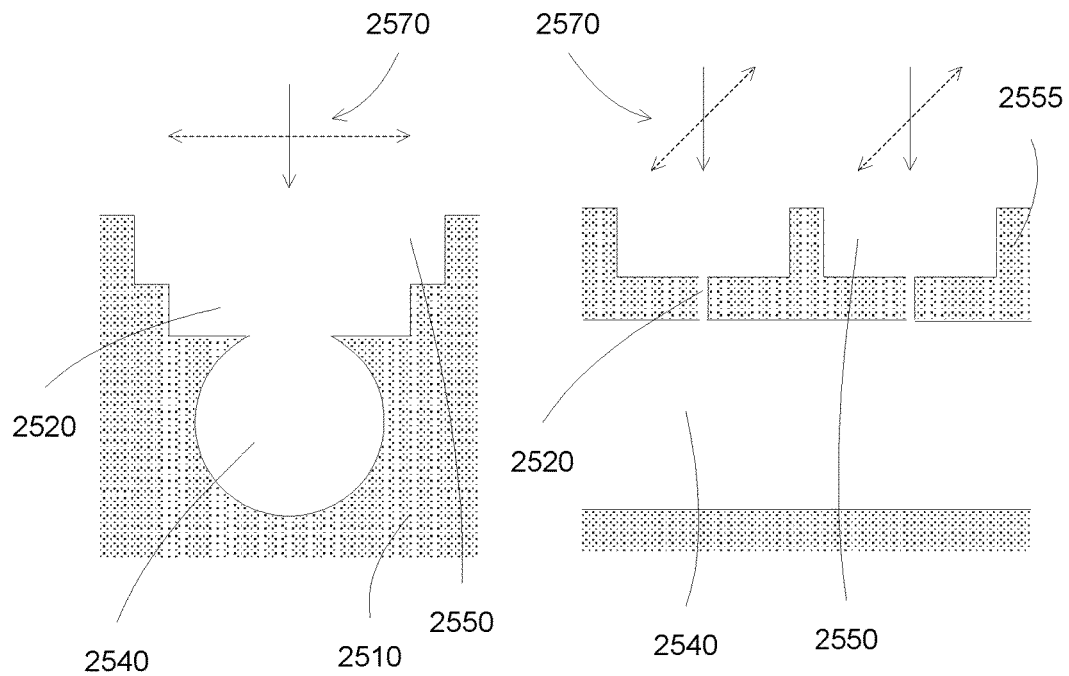
FIGS. 25A-25B illustrate configurations of surface connection slot using a liquid jet guided laser process according to some embodiments.
Figure 25B:
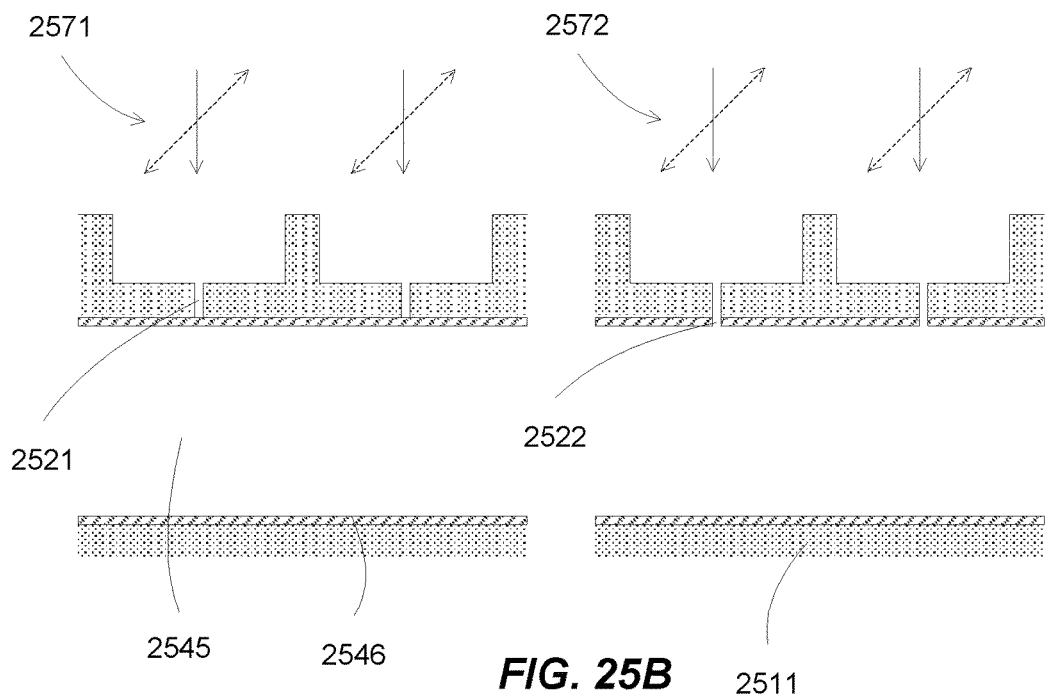

FIGS. 25A-25B illustrate configurations of surface connection slot using a liquid jet guided laser process according to some embodiments. In FIG. 25A, an air compression cavity 2540 can be formed in a tire mold segment 2510. The tire mold segment 2510 can also have a tread surface having multiple tread blocks 2550, separated by tread block side walls 2555. A liquid jet guided laser beam 2570 can be used to cut surface connection slots 2520. The surface connection slots 2520 can be cut across the air compression cavity 2540, e.g., multiple surface connection slots 2520 can be connected to an air compression cavity 2540.

In FIG. 25B, the air compression cavity 2545 can include a hollow element, e.g., a hollow tube having a wall 2546. The material for the wall 2546 of the hollow element can be different from the material of the tire mold segment 2511. Thus different operating steps for the liquid jet guided laser beam can be used, for example, a first step including first operating conditions 2571 to cut a first portion 2521 of the surface connection slot through the tire mold body, and a second step including second operating conditions 2572 to cut a second portion 2522 through the wall of the hollow element.

In some embodiments, the air compression cavity and connection slot can be made in one effort using the liquid-jet guided laser. The liquid-jet guided laser can form structures having depth and sidewall profiles that are configured to optimize gas flow, such as air evacuation in a mold. For example, the channels can have shapes, e.g., sidewall and depth profiles, that conform to the flow dynamic, including having minimum or reduced dead spaces or stagnant areas.

Figure 26A:
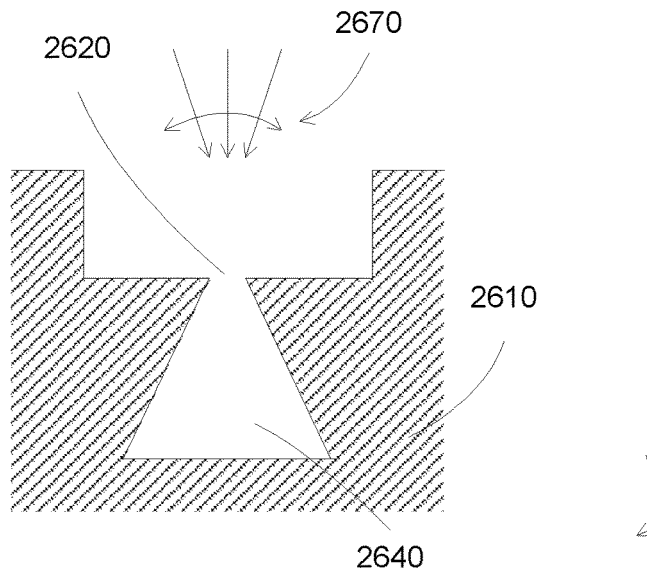
FIGS. 26A-26C illustrate configurations for air compression cavities according to some embodiments.
Figure 26B:
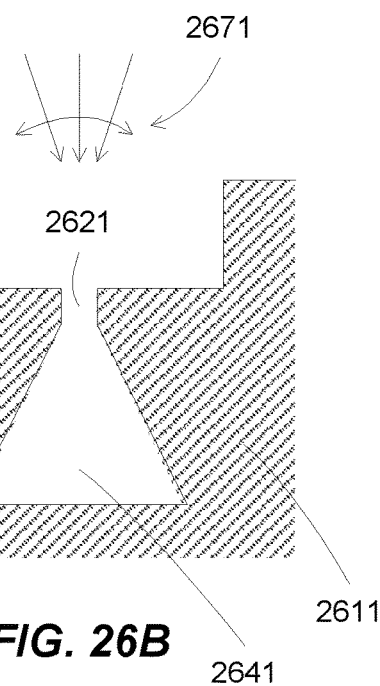
Figure 26C:
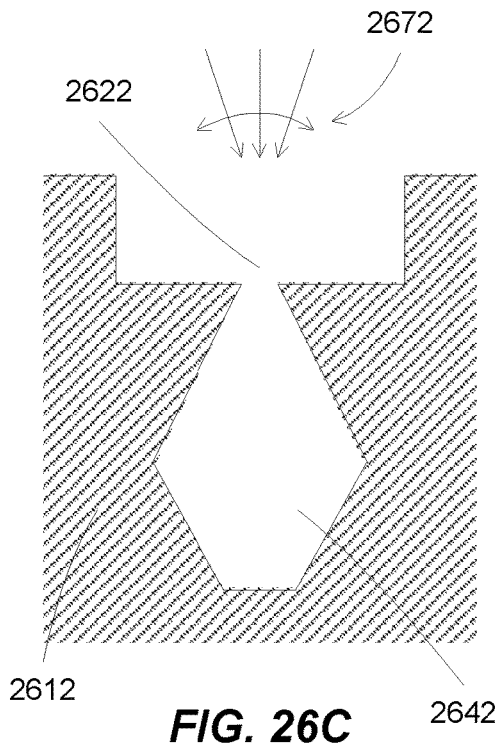

FIGS. 26A-26C illustrate configurations for air compression cavities according to some embodiments. In FIG. 26A, air compression cavity 2640 in a tire mold segment 2610 can be formed by a liquid jet guided laser system 2670. The air compression cavity 2640 can have a small opening 2620, which can function as a surface connection slot, e.g., having a dimension between 10 and 300 microns. Thus the liquid jet guided laser system 2670 can form the air compression cavity 2640 and the surface connection slot 2620 in one operation.

FIGS. 26B and 26C show different configurations for an one pass formation of the air compression cavity and the surface connection slot. A laser system 2671/2672 can be operated to form an air compression cavity 2641/2542 and a surface connection slot 2621/2622 in a tire mold segment 2611/2612.

In some embodiments, the present invention discloses methods to form surface connection slots, including an end point detection configuration for a feed back control of the surface connection slot formation. The surface connection slots can be cut by a liquid jet guided laser system, which can require multiple passes to cut through the mold material, to connect the outer surface of the mold with the air compression cavity. A sensor can be installed in a vicinity of the air compression cavity, which can detect when the laser cuts through the material. For example, the sensor can include a light detection sensor, and when the laser cut through the material, e.g., the cut surface connection slot has a connection with the cavity, light, for example a laser light, can pass through the surface connection slot to the cavity to reach the sensor. After the surface connection slot is cut through, for example, additional 2-5 passes can be performed to ensure the connection. Other sensors can be used, such as a sound sensor, which can detect a change in the sound, either amplitude or frequency, of the laser cut process. Pressure sensors can also be used for detecting pressure changes.

For a proper air evacuation from the mold during the tire curing process, it is important that the surface connection slots penetrate from the surface successfully into the compression cavities. When making such surface connection slots with a liquid-jet laser there are good ways for process control, for example by adding a sensor to an open end of the compression cavity during the laser process. Such sensor can be an optical, an acoustic or other type of sensor. In case of an optical sensor the sensitivity of the sensor is matched to the wavelength of the laser. In case the connection slot is not yet connected to the compression cavity, the compression cavity is nearly dark. Once the connection is successful, the liquid-jet laser will enter into the cavity and cause a bright laser light that will be detected easily be such sensor.

Alternatively an acoustic sensor can be used. The compression cavity can function as an acoustic resonator. As soon as the liquid-jet laser connects the surface of the mold to the compression cavity a strong tone can be observed from the compression cavity.

Such sensor can be coupled to the CNC controls of the machine in which the liquid-jet laser is integrated. It could be set up as such that after detection of a successful connection of the mold surface to the compression cavity, 1, 2, or 10 more buffer passes are made to have a good connection. Such closed-loop feedback allows to automatically react on alloy impurities of the mold as well as distance differences of the compression cavity to the surface.

Figure 27A:
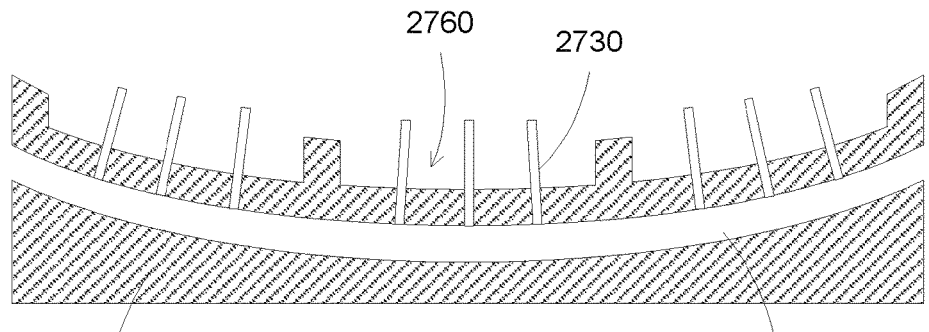
FIGS. 27A-27C illustrate an end point detection for a surface connection slot formation according to some embodiments.
Figure 27B:
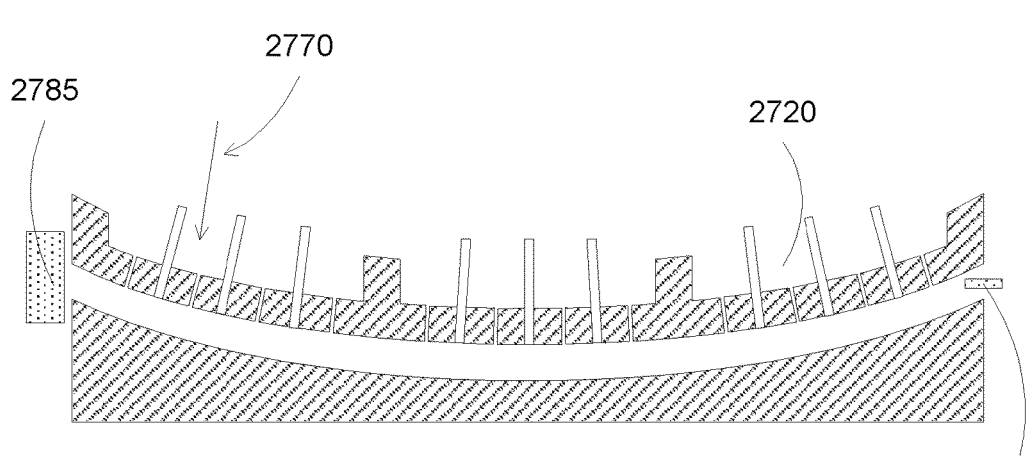
Figure 27C:
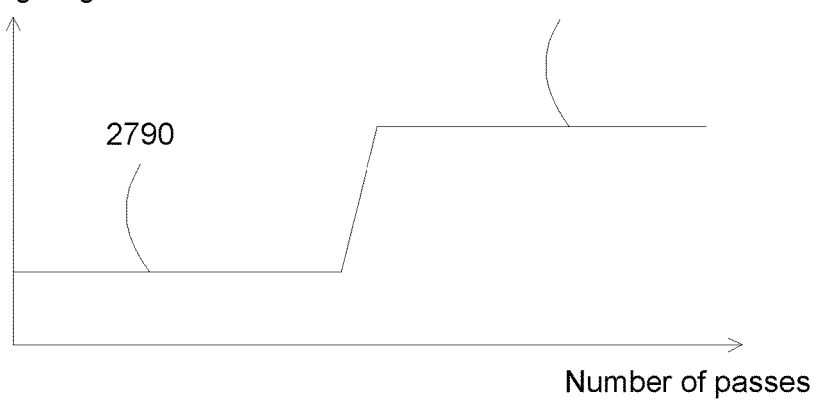

FIGS. 27A-27C illustrate an end point detection for a surface connection slot formation according to some embodiments. In FIG. 27A, a tire mold 2710 has been prepared, including an air compression cavity 2740 and sipes 2730. The tire mold 2710 will need to have surface connection slots 2720, which can connect the top surfaces 2760 of the tread blocks with the air compression cavity 2740.

In FIG. 27B, a sensor assembly 2780/2685 can be coupled to the air compression cavity 2740. The sensor assembly 2780/2685 can include a sensor 2780 and a blocking element 2785. The sensor assembly 2780/2685 can include a sensor emitter 2780 and a sensor receiver 2785. The sensor assembly can include a photo sensor, for detecting a light change when the surface connection slots are cut through, for example, by a liquid jet guided laser system 2770. The sensor assembly can include an acoustic sensor, for detecting a sound change when the surface connection slots are cut through. The sensor assembly can include a pressure sensor, for detecting a pressure change when the surface connection slots are cut through.

FIG. 27C shows a signal detection curve, showing detected signals as a function of passes that the laser beam cuts through the mold material. In the beginning, when the laser cuts the surface connection slots, but not connected to the air compression cavity, the signal 2790 can be low. For example, a first sound (amplitude or pitch) 2790 can be detected. When the laser cuts through the mold material, e.g., the surface connection slots are connected to the air compression cavity, the signal changes, signifying a different in the cut process. For example, a second sound (amplitude or pitch) 2795 can be detected. The change in the detected signal can show a difference in the cut process, implying that the surface connection slots have been cut through. The laser cut process can stop, or laser cut process can proceed for a few more passes, such as 1, 2, or 10 more passes, to ensure a complete cut through.

The sensor can provide an end point detection for the cut process, thus can significantly reduce the required manufacturing time of the laser cut process.

Figure 28:
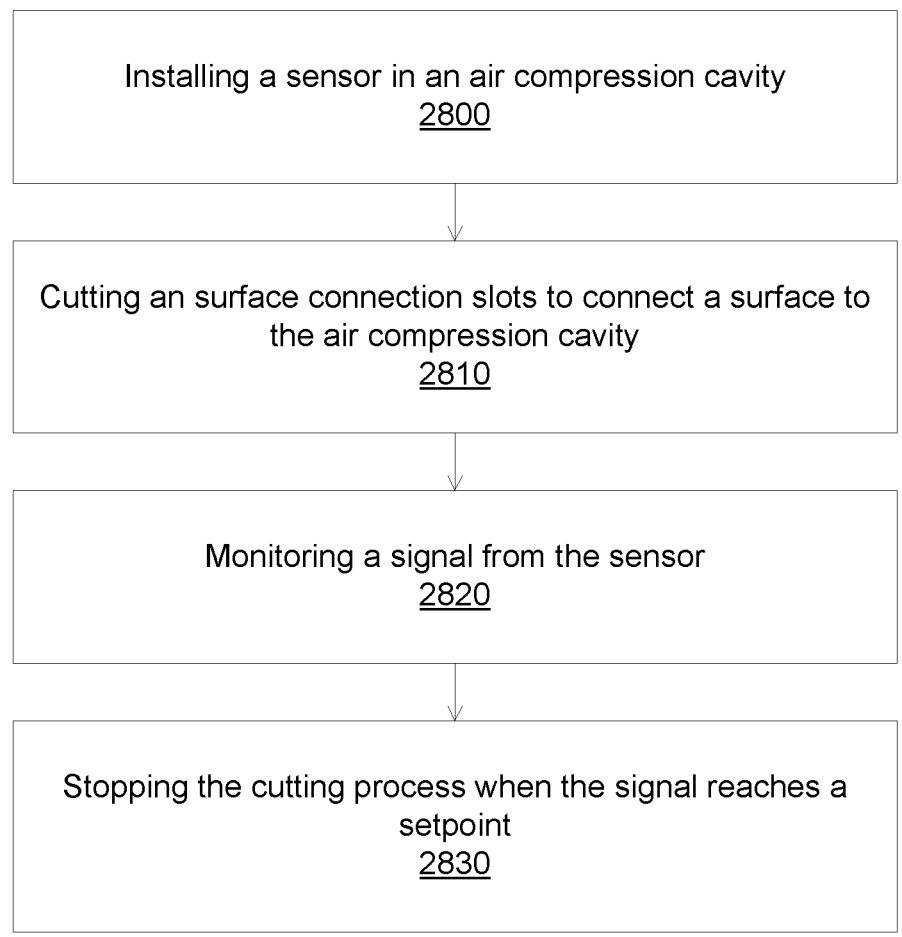
FIG. 28 illustrates a flow chart for a tire mold formation process according to some embodiments.

FIG. 28 illustrates a flow chart for a tire mold formation process according to some embodiments. After forming the mold body, including tread patterns and sipes, surface connection slots can be cut, through a cut process having end point detection using sensor. Operation 2800 installs a sensor in an air compression cavity. Operation 2810 cuts a surface connection slot to connect a surface to the air compression cavity. Operation 2820 monitors a signal from the sensor. Operation 2830 stops the cutting process when the signal reaches a set point. A few more passes can be used after the signal reaches the set point.

In some embodiments, the present invention discloses cleaning methods for cleaning tire molds, using an air compression cavity. A tire mold section, in particular the surface connection slots, can get contaminated with rubber or debris. The tire mold sections will need to be cleaned to remove the rubber or debris contaminants. A mechanical or thermal impact cleaning process, such as $CO_2$ cleaning, or selective laser cleaning only effectively reach the surface of the tire mold and cannot reach and clean inside venting structures, e.g., surface connection slots. Due to this fact, for example puzzle molds still require disassembly for periodic cleaning, to remove any rubber debris from the surface connection slots.

In some embodiments, the present invention discloses methods to clean the surface connection slots in a tire mold, using a pressurized fluid, such as a compressed gas, a pressurized liquid, or a compressed gas-liquid mixture. The pressurized fluid can be coupled to an air compression cavity. The pressurized fluid can enter and pass through the surface connection slots, effectively cleaning the surface connection slots from inside out, removing any debris in the surface connection slots. Since the air compression cavity can be connected to multiple surface connection slots, such as hundreds of surface connection slots, a small number of air compression cavities can be included in a tire mold. Thus, by connecting a pressurized fluid to the air compression cavities, the tire mold segment or the surface connection slots can be cleaned.

In some embodiments, the cleaning process can be also applicable for micro-holes or spring vents. An air compression cavity can be connected to by micro holes or by spring vents. A compression fluid can then be coupled to the air compression cavity to clean the micro holes or the spring vents from the inside out, removing any debris in the micro holes or the spring vents.

In some embodiments, the tire mold can be cleaned after performing a liquid-jet laser operation to connect the tread surface to a compression cavity. Such operation can be useful to prepare the mold for example for a subsequent coating process (for example applying an anti-sticking coating). The tire mold can also be cleaned after using the mold for curing a tire. Such operation can be performed after each tire that is cured. The tire mold can also be cleaned as a preventive maintenance of the mold. Such operation can be performed regularly after, for example, 1000, 2000 or 6000 curing cycles.

The cleaning process can include blowing a pressurized fluid from the air compression cavity to the surface connection slots. The cleaning process can be optimized for different mold operations. For example, after performing a liquid-jet laser operation, the cleaning process can include a liquid to remove debris generated from the mold fabrication process. A pressure tube can be connected to the compression cavity. A liquid or gas can be inserted at high pressure to flush and remove any debris from the compression cavity from the inside out. After this wet process the cavities can be dried by connecting CDA (Clean Dry Air) to the same compression cavity. In both cases it can be needed to close the opposite side of the compression cavity with for example a cap or gasket.

After using the mold for curing a tire, the cleaning process can include applying a pressurized air to the compression cavity to "blow" debris outside of the compression cavity and from the surface connection slots that connect such cavity to the tread surface. It can be needed to close one side of the compression cavity with for example a cap or gasket. For preventive maintenance of the mold, a pressure tube can be connected to the compression cavity. A liquid or gas can be inserted at high pressure to flush and remove any debris from the compression cavity from the inside out. For example alcohol or a rubber solvent can be used. After this wet process the cavities can be dried by connecting CDA (Clean Dry Air) to the same compression cavity. In both cases it can be needed to close the opposite side of the compression cavity with for example a cap or gasket.

In some embodiments, for debris that are firmly stuck inside a surface connection slot, a remedy can be to put such mold segment on a liquid-jet laser CNC machine and to open such channel by applying only liquid-pressure (i.e. 60-500 bar) or also to apply some laser energy to "melt" the debris and flush them away. Such step can apply during preventive maintenance to remove any metallic or rubber debris caused by the tire curing process.

Figure 29A:
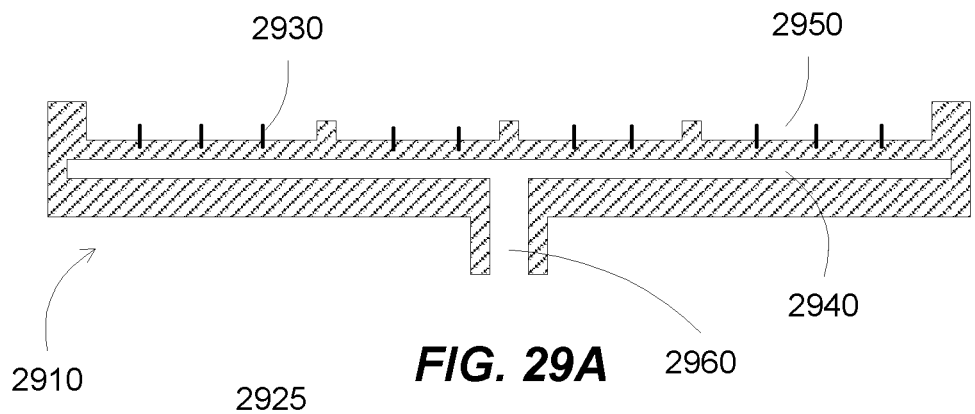
FIGS. 29A-29C illustrate a process for cleaning a tire mold segment after formation according to some embodiments.
Figure 29B:
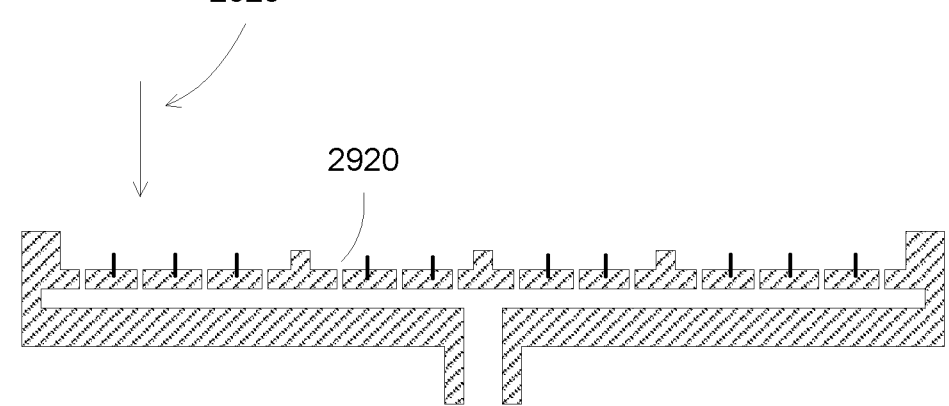
Figure 29C:
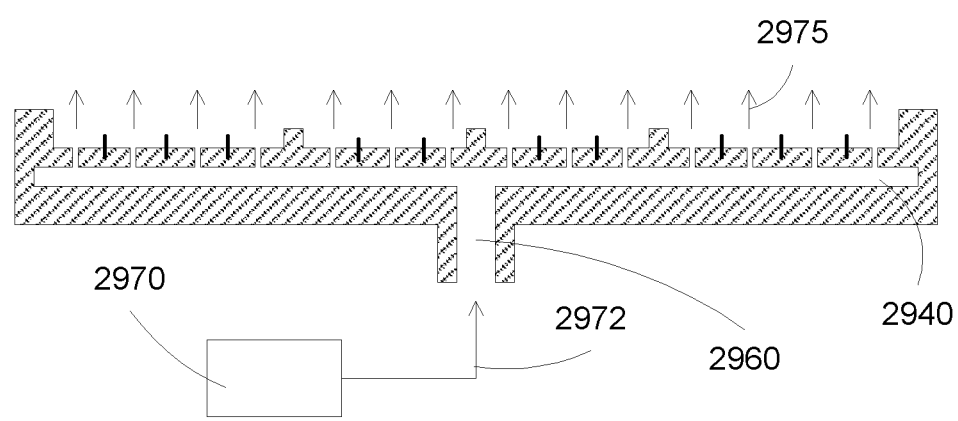

FIGS. 29A-29C illustrate a process for cleaning a tire mold segment after formation according to some embodiments. In FIG. 29A, a tire mold body 2910 can be formed, including a tread surface having multiple tread blocks 2950, and multiple sipes 2930 installed in the tread blocks. An air compression cavity 2940 can be embedded in the tire mold body. The air compression cavity 2940 can have an outlet 2960, which can be configured to be connected to an external assembly, such as a vacuum assembly or a gas or liquid source.

In FIG. 29B, surface connection slots 2920 can be formed, connecting the tread surface with the air compression cavity 2940. The surface connection slots can be formed by a liquid jet guided laser system 2925, which can cut through the material of the tire mold body with a dimension suitable for air evacuation and prevent rubber material from passing through, such as between 10 and 300 microns.

In FIG. 29C, a source 2970 can be coupled to the outlet 2960 of the air compression cavity 2940 to clean the tire mold 2910. After the formation of the tire mold 2910, debris can be present, especially at the small surface connection slots, which can prevent the surface connection slots from operating properly. A source 2970 can include a liquid source, which can provide a flow 2972 to the air compression cavity, cleaning the tire mold and the surface connection slots. A source 2970 can include a gas source or a gas/liquid mixture source, which can provide a flow 2972 to the air compression cavity, cleaning the tire mold and the surface connection slots, for example, by generating a gas flow 2975 through the surface connection slots, pushing any debris outward.

FIG. 30 illustrates a flow chart for cleaning a tire mold after making the tire mold according to some embodiments. Operation 3000 provides a tire mold body, wherein the tire mold body comprises a tread pattern of a tire, wherein the tire mold body can optionally comprise multiple sipes, wherein the tire mold body comprises an air compression cavity. Operation 3010 forms surface connection slots from the tread pattern to the air compression cavity, wherein a dimension of the surface connection slots is between 10 and 300 microns. Operation 3020 supplies a pressurized fluid to the air compression cavity, wherein the pressurized fluid escapes the surface connection slots for cleaning the tire mold.

Figure 31A:
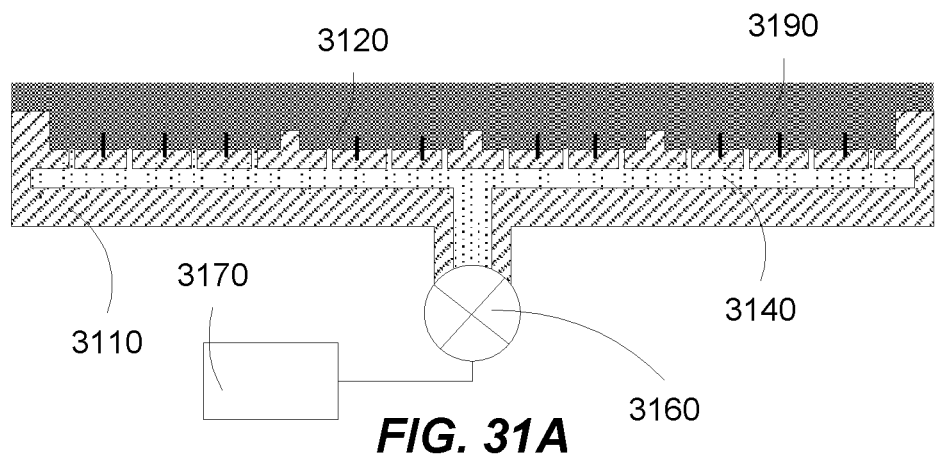
FIGS. 31A-31C illustrate processes for cleaning a tire mold segment according to some embodiments.
Figure 31B:
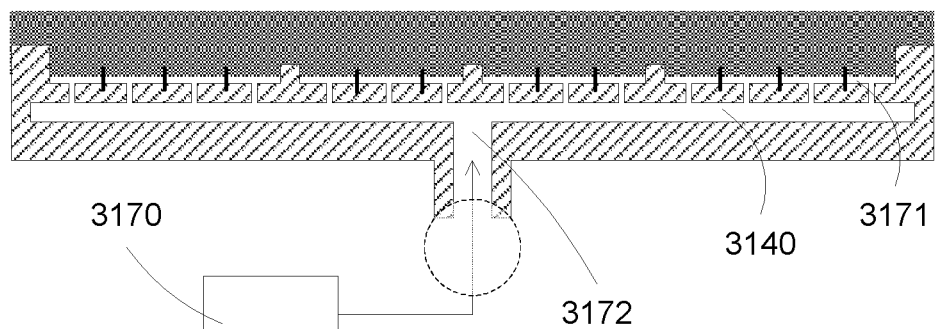
Figure 31C:
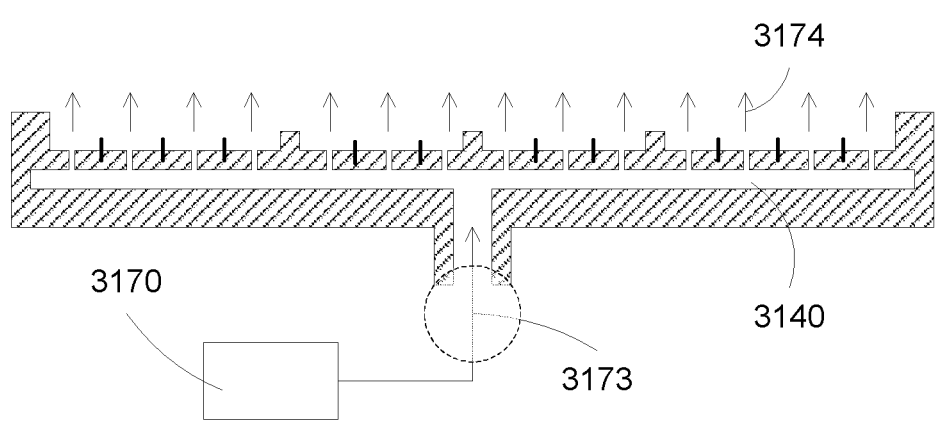

FIGS. 31A-31C illustrate processes for cleaning a tire mold segment according to some embodiments. In FIG. 31A, a tire mold segment 3110 is used for making a tire. The tire mold segment 3110 can have an air compression cavity 3140, which is connected to multiple surface connection slots 3120 in the tread pattern of the tire mold segment. The air compression cavity 3140 can include a valve 3160 coupled to an inlet of the air compression cavity. The valve can be close during the tire formation process, thus air in the tire mold can be compressed in the air compression cavity 3140.

During a tire making process, rubber material 3190 can be used, pressing on the tread pattern, and stopping at the surface connection slots. The air in the tire mold segment can escape to the air compression cavity 3140, preventing defect formation in the rubber tire.

In FIG. 31B, the valve 3160 can be open, connecting the air compression cavity 3140 with a gas source 3170. The gas source 3170 can generate an air pressure 3172 in the air compression cavity 3140. The air pressure 3172 can be controlled to lift the cured tire 3190 from the tread surface of the tire mold. For example, the air source can be controlled to provide a pressure between 1 and 2 bar, which can reduce the adhesion of the cured tire to the tread surface, and then generate an air layer 3171 under the cured tire. The air layer 3171 can assist in the removal of the cured tire.

In FIG. 31C, after one or more processes of making tires, the tire mold segment might need to be cleaned, since rubber debris can be trapped to the surface connection slots. The valve 3160 can be open, connecting the air compression cavity 3140 with the gas source 3170. The gas source 3170 can generate an air flow 3173 to the air compression cavity 3140, and then escape the air compression cavity by the surface connection slots 3120. The gas source can be controlled to provide a pressure between 1 and 10 bar, such as between 4 and 10 bar, which can force any trapped debris to get out of the surface connection slots. The cleaning process can be performed after every tire making process, or after a certain number of tire curing cycles.

Other configurations can be used, such as a vacuum assembly can be coupled to the valve 3160 (with the valve opened) at the beginning of the tire making process (when the green tire expands to fill the tread pattern) to assist in displacement of air from the mold into a compression cavity. A gas source can be coupled to the valve 3160 (with the valve opened) at the end of the time making process (after the green tire reaches the tread pattern) to assist in preventing the rubber material from entering the surface connection slots. Hot gas source or pulsed gas source can be used.

Figure 32A:
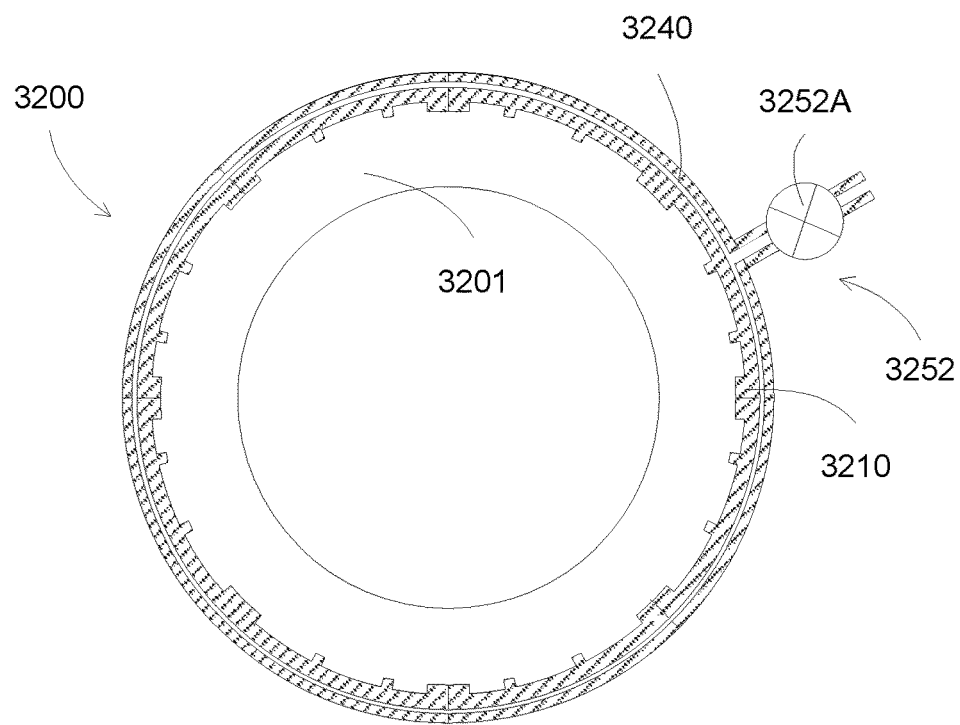
FIGS. 32A-32D illustrate a process for post treatment a tire mold according to some embodiments.

FIGS. 32A-32D illustrate a process for post treatment a tire mold according to some embodiments. In FIG. 32A, a complete mold 3200, including multiple tire mold segments 3210, can be used to form a tire. The tire mold segments 3210 can be assembled to form the circumferential mold 3200, enclosing a green tire 3201 in between. During the tire curing process, air in the tire mold can escape to an air compression cavity 3240, which has an outlet 3252 with a closed valve 3252A. Thus the air in the tire mold is compressed in the air compression cavity during the tire curing process.

Figure 32B:
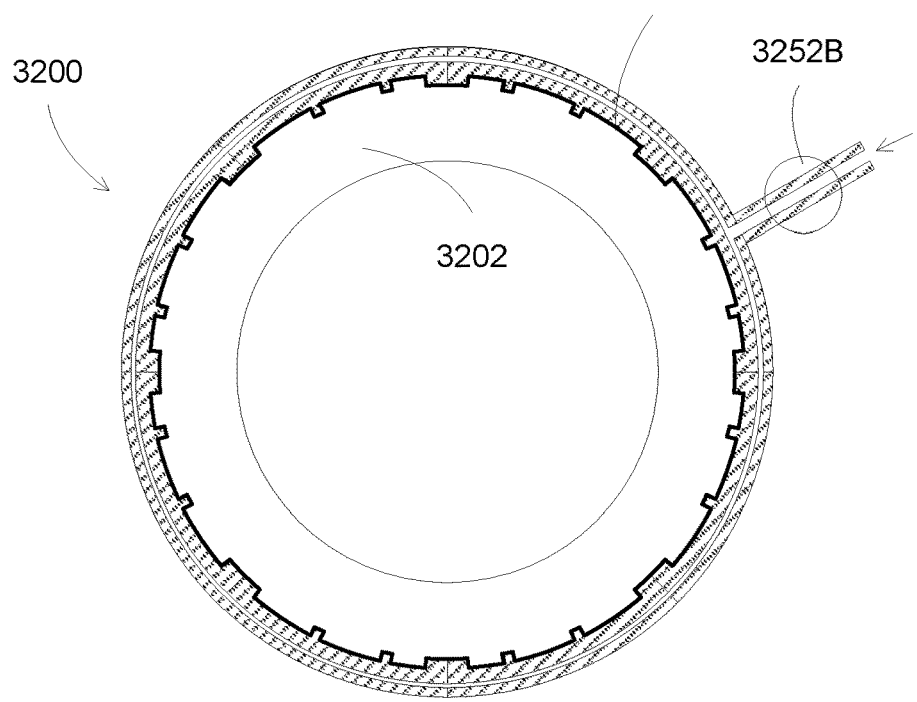

In FIG. 32B, after the tire curing process is complete, a pressurized fluid, such as a compressed air, can be applied to the outlet 3252 with an open valve 3252B. The compressed air can pressurize the air compression cavity, which then can exert a force on the cured rubber tire 3202 through the surface connection slots. The pressurized air can form a layer of air 3257 at the interface of the rubber surface and the tire mold surface, effectively reducing or eliminating the adhesion of the rubber material to the tire mold surface.

Figure 32C:
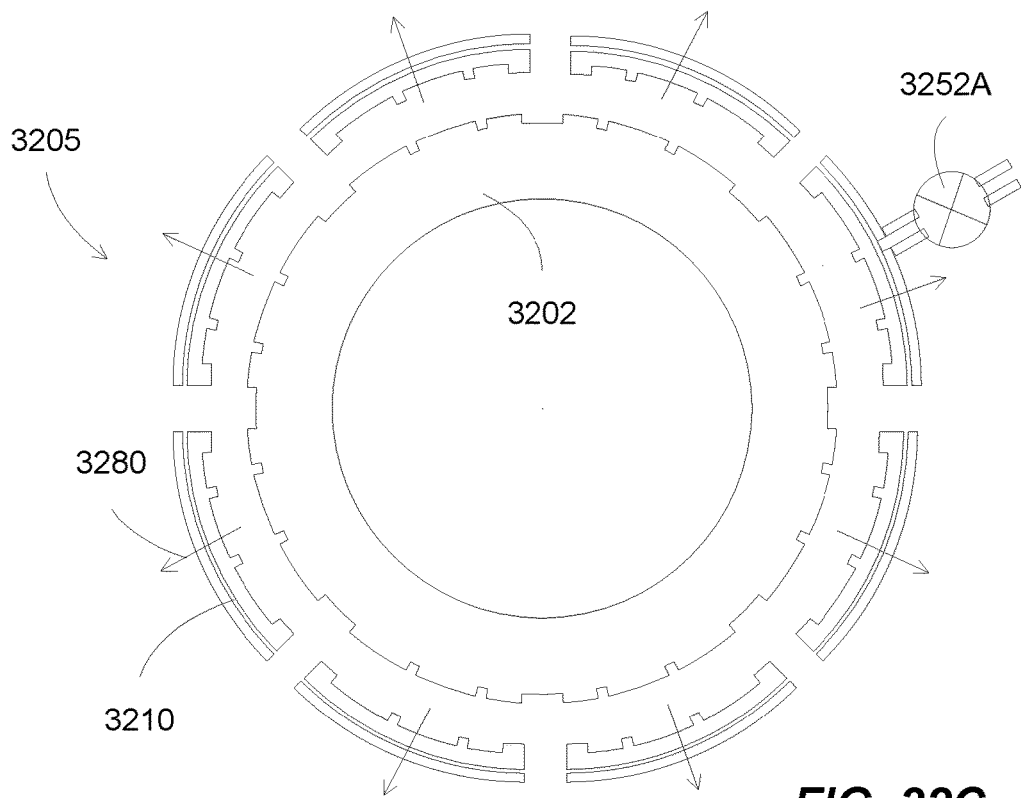

In FIG. 32C, the tire mold segments 3210 can be released, for example, by expanding outward 3280. Valve 3252 can be closed 3252A. The cured rubber tire 3202 can be removed from the released tire mold configuration 3205. Since the adhesion between the tire 3202 and the tire mold segments 3210 can be significantly reduced by the air layer 3257, the tire 3202 can be easily removed from the tire mold segments 3210.

Figure 32D:
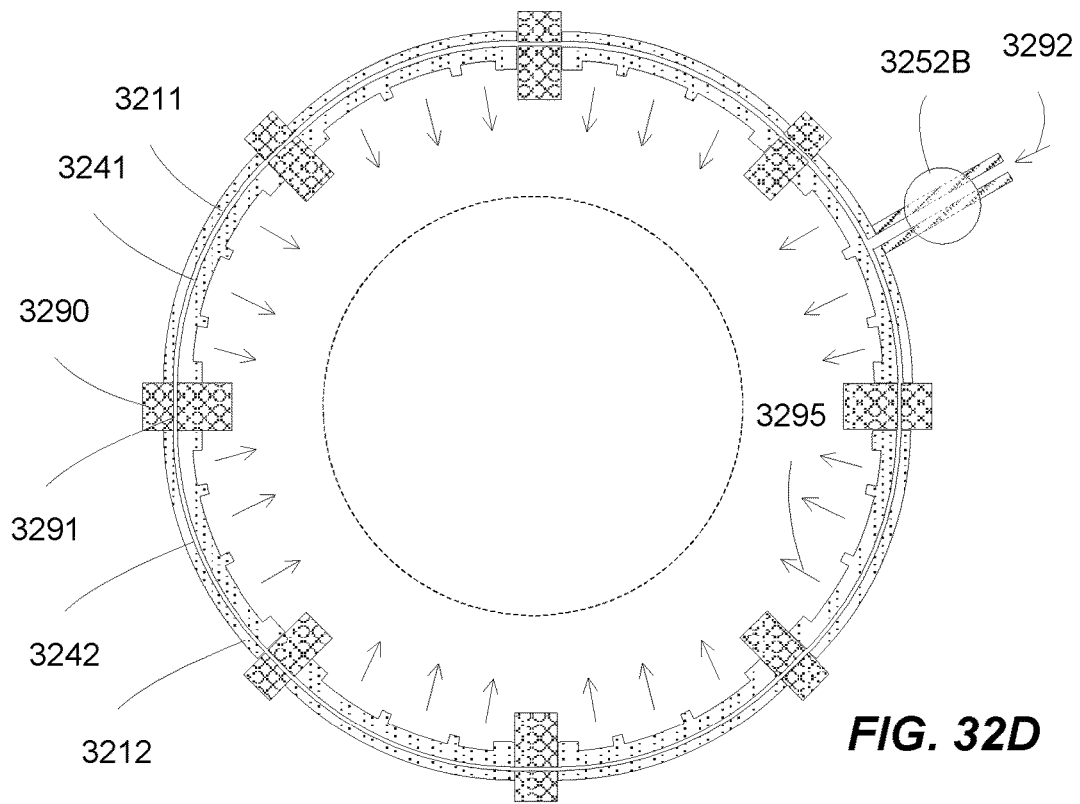

In FIG. 32D, the tire mold segments can be prepared to be cleaned. Coupling elements 3290 can be placed between the tire mold segments to connect the air compression cavities between the tire mold segments. For example, a coupling element 3290 can have a conduit 3291 that connects the air compression cavity 3241 of the tire mold segment 3211 with the air compression cavity 3242 of the tire mold segment 3212. The coupling elements 3290 and the tire mold segments 3210 can form a complete air circuit, allowing a pressurized fluid 3292 to enter the air compression cavities for cleaning the surface connection slots of the tire mold segments. For example, a pressurized fluid, such as a compressed air, can be applied to the open valve 3252B, pressurizing the air compression cavities, and released 3295 through the surface connection slots to clean the tire mold, especially cleaning the surface connection slots.

Other configurations can be used. For example, the coupling elements can include an outlet for connecting to a source of pressurized fluid. Thus each coupling elements can be used to clean two adjacent tire mold segments.

Figure 33:
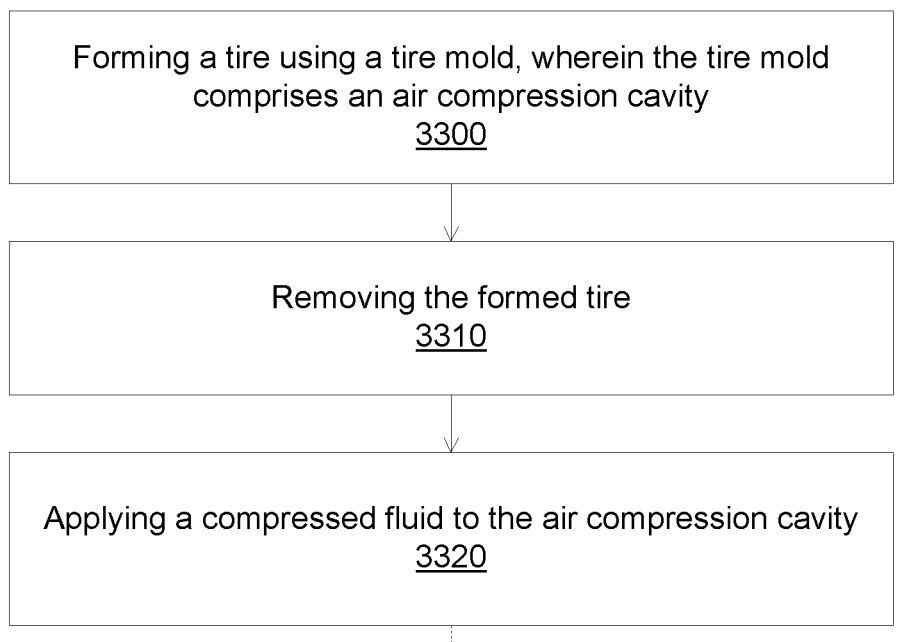
FIG. 33 illustrates a flow chart for cleaning a tire mold according to some embodiments.

FIG. 33 illustrates a flow chart for cleaning a tire mold according to some embodiments. Operation 3300 forms a tire using a tire mold, wherein the tire mold comprises an air compression cavity. Operation 3310 removes the formed tire. Operation 3320 applies a pressurized fluid to the air compression cavity.

In some embodiments, the tire mold can include multiple tire mold segments that are assembled together to form a tire. After the tire is formed, the tire mold segments can be disassembled, for example, to take out the tire. The tire mold segments can be re-assembled, and a pressurized fluid can be applied to the air compression cavity to clean the surface connection slots.

What is claimed is:

1. A method for making a tire mold with at least one tire mold segment, the method comprising:
    forming the tire mold segment with at least one part, wherein at least:
        one part is formed consisting of at least one mold insert, wherein:
            the mold insert includes a tire tread pattern at a top surface,
            the mold insert includes at least one surface connection slot, wherein the surface connection slot is formed as an opening through the mold insert body, to connect the mold insert top surface and back surface;
        one part is formed consisting of at least one mold support, wherein:
            the mold support forms the body of the mold segment;
    configuring the parts such that:
        the mold insert is attached to the mold support to form the tire mold segment;
    configuring the at least two tire mold segments to be adjacently closed to form a mold for making tires;
    forming the mold insert with at least one air compression cavity at the opposite back surface;
    forming multiple connection slots to connect the front surface with the air compression cavity;
    forming the compression cavities such that they are physically separated from the top surface;
    forming the compression cavities such that the compression cavities are isolated from the outside ambient during the tire making process;
    forming the connection slots such that the dimension of the surface connection slots are configured to allow air to pass through, and prevent rubber material from entering.

2. A method as in claim 1, wherein:
the tire mold segment is a two-part tire mold segment.

3. A method as in claim 1, wherein:
multiple mold inserts are attached to the respective mold support.

4. A method as in claim 1, wherein:
at least a part of the mold segments are formed by an additive manufacturing process, wherein:
    the mold inserts are made by an additive manufacturing method.

5. A method as in claim 4, wherein:
the additive manufacturing process is 3D-printing.

6. A method as in claim 1, wherein:
the tread pattern of the mold insert includes multiple tread blocks which are separated by side walls.

7. A method as in claim 1, wherein:
the tread pattern of the mold insert includes sipes.

8. A method as in claim 1, wherein:
the surface connection slots are of any shape having dimensions between 10 and 300 microns.

9. A method as in claim 1, wherein:
the surface connection slots and/or air compression cavity are formed by a liquid-jet guided laser.

10. A method as in claim 1, wherein:
the compression cavity is of any shape having dimensions between 1 and 10 mm.

11. A method as in claim 1, wherein:
the connection slots and/or air compression cavity are formed after completion of the mold insert.

12. A method as in claim 1, wherein:
the mold support is formed by casting or milling.

13. A method as in claim 1, wherein:
either the mold support is formed with recesses on a top surface or the mold insert is formed with recesses on a bottom surface, which, after the mold insert is coupled with the mold support, respectively forms an air compression cavity, wherein the recess forms a cavity between the back surface of the mold insert and top surface of the mold support, and wherein the connection slots formed in the mold inserts align with the recesses.

14. A method as in claim 1, wherein:
The at least one mold insert can be replaced or interchanged from the mold support.

15. A tire mold comprising of at least one tire mold segment, wherein:
    the tire mold segment is multiple-parts, wherein:
        one part consists of at least one mold insert, wherein:
            the mold insert includes a tire tread pattern at a top surface,
            the mold insert includes at least one surface connection slot, wherein the surface connection slot connects the mold insert top surface and back surface;
        one part consists of at least one mold support, wherein:
            the mold support forms the body of the mold segment;
    the parts are configured such that:
        the mold insert is attached to the mold support to form the tire mold segment,
        the at least two tire mold segments adjacently connect to form a mold for making tires;
    the mold insert is configured with at least one air compression cavity at the opposite back surface;
    the multiple connection slots connect the front surface with the air compression cavities;
    the compression cavities are configured such that they are physically separated from the top surface;
    the compression cavities are isolated from the outside ambient during the tire making process;
    the connection slots are configured such that the dimension of the surface connection slots allow air to pass through, and prevent rubber material from entering.

16. A tire mold as in claim 15, wherein:
at least a part of the mold segments are formed by an additive manufacturing process.

17. A tire mold as in claim 15, wherein:
the mold support has recesses on a top surface, which, after the mold insert is coupled with the mold support, forms an air compression cavity, wherein the recess forms a cavity between the back surface of the mold insert and top surface of the mold support.

18. A tire mold as in claim 16, wherein:
the additive manufacturing process is 3D printing.

* * * * *